(12) United States Patent
Hong et al.

(10) Patent No.: US 11,373,627 B2
(45) Date of Patent: Jun. 28, 2022

(54) ELECTRONIC DEVICE AND METHOD FOR MOVING CONTENT DISPLAY POSITION ON BASIS OF COORDINATE INFORMATION STORED IN DISPLAY DRIVER CIRCUIT

(71) Applicant: SAMSUNG ELECTRONICS CO., LTD., Suwon-si (KR)

(72) Inventors: Yunpyo Hong, Suwon-si (KR); Jongkon Bae, Suwon-si (KR); Yohan Lee, Suwon-si (KR); Hanyuool Kim, Suwon-si (KR); Dongkyoon Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/956,283

(22) PCT Filed: Dec. 17, 2018

(86) PCT No.: PCT/KR2018/016018
§ 371 (c)(1),
(2) Date: Jun. 19, 2020

(87) PCT Pub. No.: WO2019/124907
PCT Pub. Date: Jun. 27, 2019

(65) Prior Publication Data
US 2021/0082375 A1    Mar. 18, 2021

(30) Foreign Application Priority Data

Dec. 20, 2017 (KR) .................. 10-2017-0176395

(51) Int. Cl.
*G06F 1/3203* (2019.01)
*G09G 5/38* (2006.01)

(52) U.S. Cl.
CPC ............. *G09G 5/38* (2013.01); *G06F 1/3203* (2013.01); *G09G 2310/08* (2013.01);
(Continued)

(58) Field of Classification Search
None
See application file for complete search history.

(56) References Cited

U.S. PATENT DOCUMENTS 6,288,715 B1 * 9/2001 Bain .................... G06Q 10/107
345/211
8,766,919 B1 * 7/2014 Lachwani ............. G06F 1/3265
345/168

(Continued)

FOREIGN PATENT DOCUMENTS

EP    2 973 535    1/2016
EP    3 582 065    12/2019
(Continued)

OTHER PUBLICATIONS

International Search Report for PCT/KR2018/016018, dated Mar. 29, 2019, 4 pages.
(Continued)

*Primary Examiner* — Joni Hsu
(74) *Attorney, Agent, or Firm* — Nixon & Vanderhye, P.C.

(57) ABSTRACT

An electronic device according to various embodiments may comprise a display panel, a processor, and a display driver circuit including an internal memory and configured to drive the display panel, wherein the display driver circuit may be configured to: receive, from the processor, movement information of a designated content to be displayed on the display panel while the processor operates in a low power state; store the movement information in the internal memory; display the designated content at a first position on the
(Continued)

display panel while the processor operates in the low power state; and move the designated content displayed at the first position to a second position on the display panel and display the same at the second position, at least on the basis of the movement information stored in the internal memory while the processor operates in the low power state.

15 Claims, 11 Drawing Sheets

(52) U.S. Cl.
CPC . *G09G 2320/046* (2013.01); *G09G 2330/023* (2013.01); *G09G 2340/0464* (2013.01); *G09G 2360/12* (2013.01)

(56) References Cited

U.S. PATENT DOCUMENTS

| | | | |
|---|---|---|---|
| 9,471,911 B2* | 10/2016 | Futatsugi | G01C 21/32 |
| 2005/0114800 A1* | 5/2005 | Rao | H04M 1/72427 |
| | | | 715/867 |
| 2006/0001601 A1 | 1/2006 | Ono | |
| 2007/0001993 A1* | 1/2007 | Koizumi | H05B 41/2983 |
| | | | 345/101 |
| 2008/0247454 A1* | 10/2008 | Movshovich | H04N 5/12 |
| | | | 375/240.01 |
| 2014/0281607 A1 | 9/2014 | Tse | |
| 2015/0033047 A1* | 1/2015 | Byun | G06F 1/325 |
| | | | 713/320 |
| 2016/0253930 A1 | 9/2016 | Lee | |
| 2017/0116915 A1* | 4/2017 | Song | G09G 3/20 |
| 2017/0116927 A1* | 4/2017 | Bae | G09G 3/3677 |
| 2017/0213493 A1 | 7/2017 | Han | |
| 2018/0025468 A1 | 1/2018 | Kim et al. | |
| 2018/0131869 A1 | 5/2018 | Kim et al. | |

FOREIGN PATENT DOCUMENTS

| | | |
|---|---|---|
| KR | 10-0556384 | 3/2006 |
| KR | 10-2006-0079697 | 7/2006 |
| KR | 10-2010-0058757 | 6/2010 |
| KR | 10-2011-0008500 | 1/2011 |
| KR | 10-2012-0068425 | 6/2012 |
| KR | 10-2017-0008698 | 1/2017 |
| KR | 10-2017-0088452 | 8/2017 |
| KR | 10-2018-0011581 | 2/2018 |
| KR | 10-2018-0052002 | 5/2018 |
| KR | 10-2018-0109626 | 10/2018 |
| WO | 2014/149346 | 9/2014 |

OTHER PUBLICATIONS

Written Opinion of the ISA for PCT/KR2018/016018, dated Mar. 29, 2019, 7 pages.
Communication pursuant to Rule 164(1) EPC dated Feb. 2, 2021 in counterpart European Patent Application No. EP18891308.1.
Extended Search Report dated May 3, 2021 in counterpart European Patent Application No. EP18891308.1.
Office Action dated May 31, 2021 in counterpart Indian Patent Application No. 202027030395 and English-language translation.
Notice of Preliminary Rejection dated Jan. 25, 2022 in counterpart Korean Patent Application No. KR10-2017-0176395 and English-language translation.

* cited by examiner

| Jump Type | Initial | Small Jump Operation | | | | | Middle Jump Operation | | | Big Jump Operation | |
|---|---|---|---|---|---|---|---|---|---|---|---|
| | | Small | Small | Small | Small | ... | Middle | Small | Small | ... | Big |
| Position at which image is displayed on display panel | (300, 800) | (300, 801) | (301, 800) | (301, 801) | (301, 802) | ... | (301, 802) | (301, 803) | (302, 803) | ... | (400, 300) |
| Position of image recognized by first processor | (300, 800) | (300, 800) | (300, 800) | (301, 800) | (301, 802) | ... | (301, 802) | (301, 802) | (301, 802) | ... | (400, 300) |
| State of display driving circuit | (0,0) Move on | (0,1) Move on | (1,0) Move on | (1,1) Move on | (0,0) Move Reset | ... | (0,0) Move Reset | (0,1) Move on | (1,0) Move on | ... | (0,0) Move Reset |
| State of first processor | (300, 800) Drawing | Sleep | Sleep | Sleep | (301, 802) Drawing | ... | (301, 802) Drawing | Sleep | Sleep | ... | (400, 300) Drawing |
| State of display panel | (300, 800) | (300, 801) | (301, 800) | (301, 801) | (301, 802) | ... | (301, 802) | (301, 803) | (302, 803) | ... | (400, 300) Drawing |

ELECTRONIC DEVICE AND METHOD FOR MOVING CONTENT DISPLAY POSITION ON BASIS OF COORDINATE INFORMATION STORED IN DISPLAY DRIVER CIRCUIT

This application is the U.S. national phase of International Application No. PCT/KR2018/016018 filed 17 Dec. 2018, which designated the U.S. and claims priority to KR Patent Application No. 10-2017-0176395 filed 20 Dec. 2017, the entire contents of each of which are hereby incorporated by reference.

TECHNICAL FIELD

Various embodiments described below relate to an electronic device for moving a display position of a content based on coordinate information stored in a display driving circuit, and a method thereof.

BACKGROUND ART

An electronic device, such as a smart phone, a tablet Personal Computer (PC), or a smart watch, may display various contents, including images, text, and the like, on a display panel. The display panel may be driven by a display driving circuit.

The display driving circuit may store, on a frame-by-frame basis, data of a content to be displayed by multiple pixels constituting the display panel, and may display the content on the display panel according to a designated timing signal.

SUMMARY

In the case of an Organic Light-Emitting Diode (OLED) display, due to a characteristic of an element thereof, when the same screen is continuously displayed, the performance of a particular pixel may be degraded, so as to cause a burn-in phenomenon in which a residual image occurs in the display.

Meanwhile, an electronic device may provide an Always-On Display (AOD) mode for displaying a content on a display while a processor of the electronic device is in a sleep state. In order to prevent a burn-in phenomenon, the electronic device, which provides the AOD mode, may switch a state of the processor in the sleep state to an active state, and may change a display position of a content via the processor which operates in the active state. The switching of the processor to the active state may cause power consumption.

The technical subjects pursued in the disclosure may not be limited to the above mentioned technical subjects, and other technical subjects which are not mentioned may be clearly understood, through the following descriptions, by those skilled in the art to which the disclosure pertains.

In accordance with an aspect of the disclosure, an electronic device may include: a display panel; a processor; and a display driving circuit including an internal memory and configured to drive the display panel, wherein the display driving circuit is configured to: while the processor operates in an active state, receive, from the processor, coordinate information of a designated content to be displayed on the display panel while the processor operates in a low-power state; store the coordinate information in the internal memory; display the designated content at a first position on the display panel while the processor operates in the low-power state; and move the designated content displayed at the first position to a second position on the display panel and display the designated content at the second position, at least based on the coordinate information stored in the internal memory while the processor operates in the low-power state.

In accordance with another aspect of the disclosure, an electronic device may include: a display panel; a processor; and a display driving circuit including an internal memory and configured to drive the display panel, wherein the display driving circuit is configured to: receive, from the processor, movement information of a designated content to be displayed on the display panel while the processor operates in a low-power state; store the movement information in the internal memory; display the designated content at a first position on the display panel while the processor operates in the low-power state; and move the designated content displayed at the first position to a second position on the display panel and display the designated content at the second position, at least based on the movement information stored in the internal memory while the processor operates in the low-power state.

In accordance with still another aspect of the disclosure, an electronic device may include: a display driving circuit including a timer and configured to be functionally coupled to a display panel; and a processor configured to be functionally coupled to the display driving circuit, wherein the processor is configured to switch a state of the processor to an inactive state based on providing the display driving circuit with information on an image, and the display driving circuit is configured to: while the processor is in the inactive state, display the image on the display panel and acquire, via the timer, information on a time elapsing since display of the image; and change a display position of the image at every designated periodicity based on the information on the time while the processor is in the inactive state.

In accordance with yet another aspect of the disclosure, a method of an electronic device may include: while a processor of the electronic device operates in an active state, receiving, from the processor, coordinate information of a designated content to be displayed on a display panel of the electronic device while the processor operates in a low-power state, by a display driving circuit of the electronic device; storing the coordinate information in an internal memory of the display driving circuit by the display driving circuit; displaying the designated content at a first position on the display panel while the processor operates in the low-power state, by the display driving circuit; and moving the designated content displayed at the first position to a second position on the display panel and displaying the designated content at the second position, at least based on the coordinate information stored in the internal memory while the processor operates in the low-power state, by the display driving circuit.

In accordance with still yet another aspect of the disclosure, a method of an electronic device may include: receiving, from a processor of the electronic device, movement information of a designated content to be displayed on the display panel while the processor operates in a low-power state, by a display driving circuit of the electronic device; storing the movement information in an internal memory of the display driving circuit by the display driving circuit; displaying the designated content at a first position on the display panel while the processor operates in the low-power state, by the display driving circuit; and moving the designated content displayed at the first position to a second position on the display panel and displaying the designated content at the second position, at least based on the movement information stored in the internal memory while the processor operates in the low-power state, by the display driving circuit.

In accordance with a further aspect of the disclosure, a method of an electronic device may include: switching a state of a processor of the electronic device to an inactive state based on providing a display driving circuit of the electronic device with information on an image, by the processor; while the processor is in the inactive state, displaying the image on a display panel of the electronic device and acquiring, via a timer within the display driving circuit, information on a time elapsing since display of the image, by the display driving circuit; and changing a display position of the image at every designated periodicity based on the information on the time while the processor is in the inactive state, by the display driving circuit.

An electronic device and a method thereof according to various embodiments can reduce the power, consumed by a processor, by changing a position of the image displayed on a display at every designated periodicity based on the information on the time acquired via a timer included in a display driving circuit of the electronic device.

Effects obtainable from the disclosure may not be limited to the above mentioned effects, and other effects which are not mentioned may be clearly understood, through the following descriptions, by those skilled in the art to which the disclosure pertains.

BRIEF DESCRIPTION OF THE DRAWINGS

FIG. 10 illustrates an example of a method for moving an image during provision of an AOD mode in an electronic device according to various embodiments.

DETAILED DESCRIPTION OF EXAMPLE EMBODIMENTS

Figure 1:
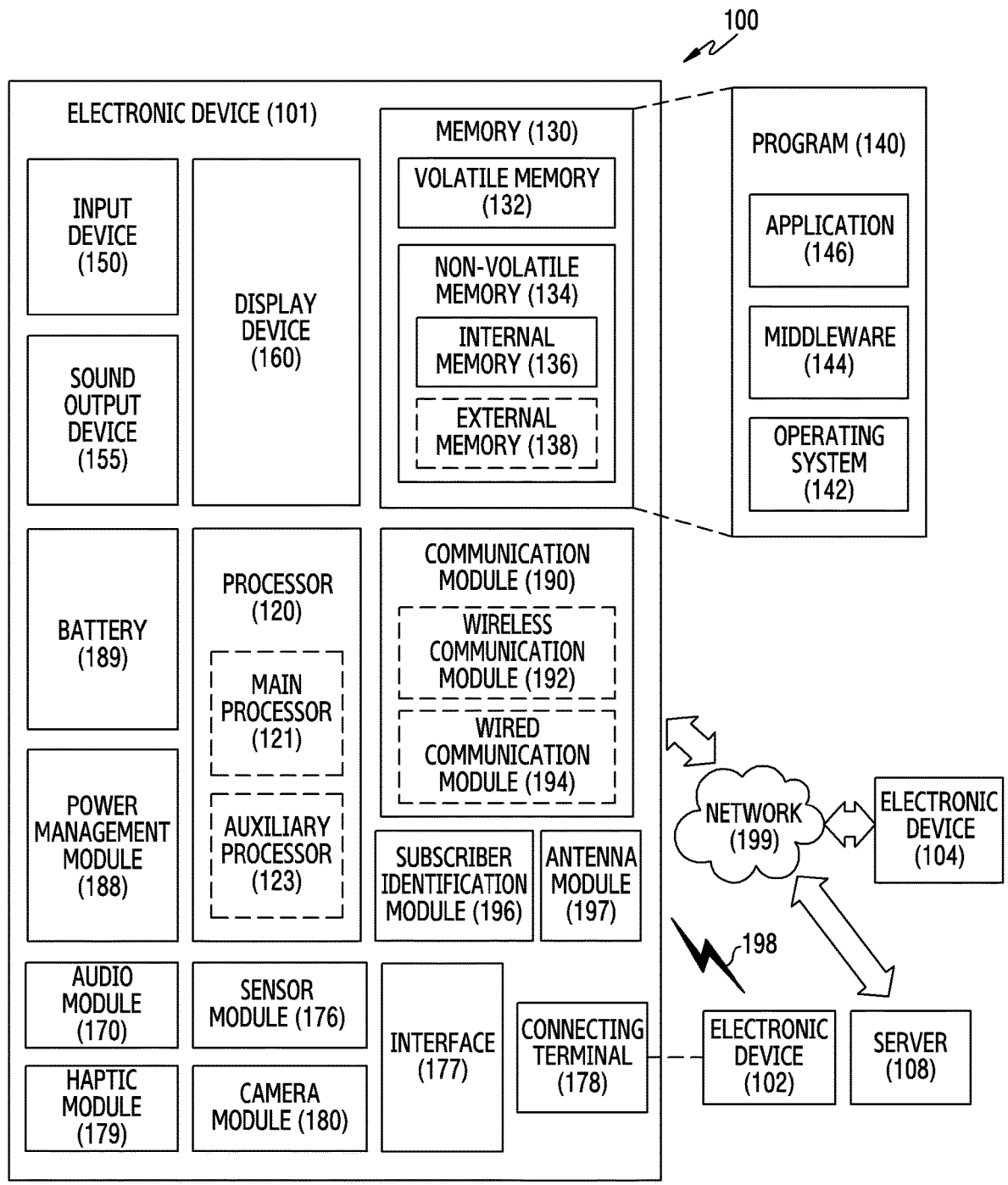
FIG. 1 is a block diagram of an electronic device which is in a network environment and is configured to move a display position of a content based on coordinate information stored in a display driving circuit, according to various embodiments.

FIG. 1 is a block diagram of an electronic device which is in a network environment and is configured to move a display position of a content based on coordinate information stored in a display driving circuit, according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, using subscriber information stored in the subscriber identification module 196.

The antenna module 197 may transmit or receive a signal or power to or from the outside (e.g., the external electronic device) of the electronic device 101. According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
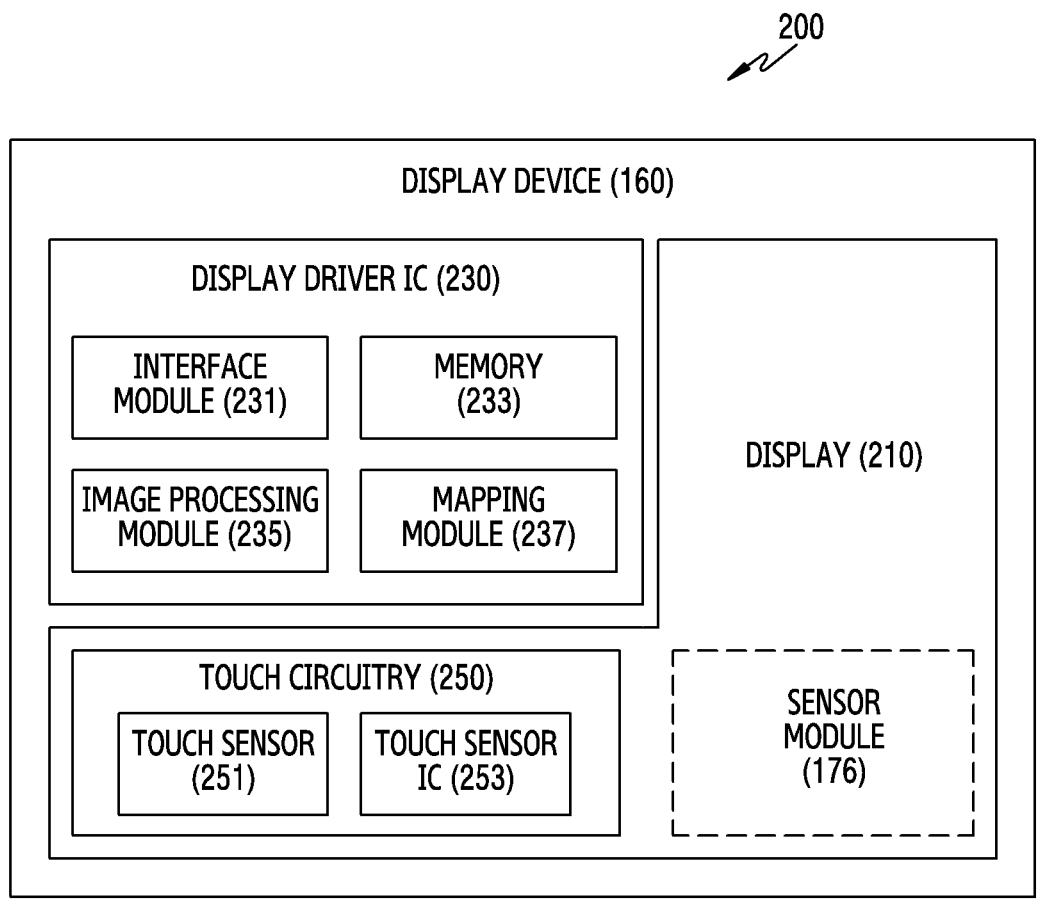
FIG. 2 is a block diagram of a display apparatus configured to move a display position of a content based on coordinate information stored in a display driving circuit according to various embodiments.

FIG. 2 is a block diagram of a display apparatus configured to move a display position of a content based on coordinate information stored in a display driving circuit according to various embodiments. Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
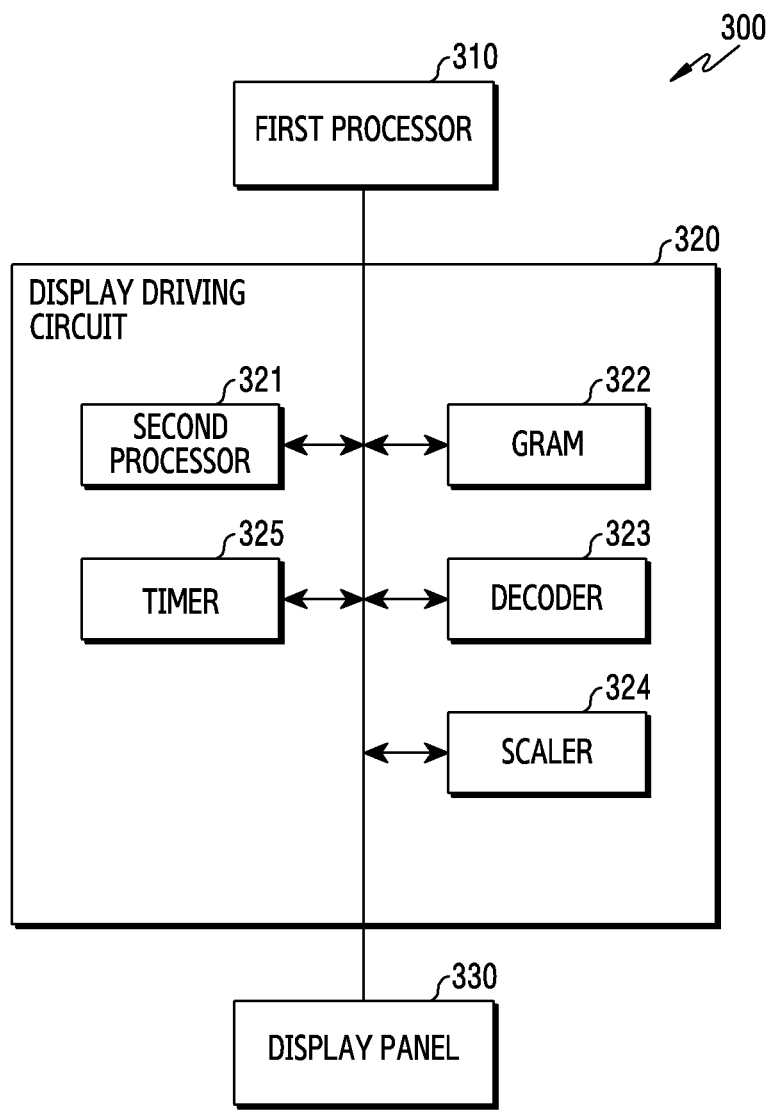
FIG. 3 illustrates an example of a functional configuration of an electronic device according to various embodiments.

FIG. 3 illustrates an example of a functional configuration of an electronic device according to various embodiments. The functional configuration may be included in the electronic device 101 illustrated in FIG. 1.

Referring to FIG. 3, the electronic device 300 may include a first processor 310, a display driving circuit 320, and a display panel 330.

The first processor 310 may include the main processor 121 illustrated in FIG. 1, the display driving circuit 320 may include a display driver IC 230 illustrated in FIG. 2, and the display panel 330 may include the display 210 illustrated in FIG. 2.

In various embodiments, the first processor 310 may identify whether to change a driving mode (or an operation mode) (e.g., a screen mode) of the electronic device 300. Examples of the driving mode may include a normal mode and an AOD mode. The normal mode may refer to a mode for displaying a screen on the display panel 330 while the first processor 310 is in an active mode. The active state may refer to a state in which a Power Management Integrated Circuit (PMIC) (not illustrated) of the electronic device 300 provides steady-state power to the first processor 310. The normal mode may refer to a mode in which the first processor 310 displays a screen on the display panel 330 by controlling the display driving circuit 320. When a screen is displayed based on the normal mode, the first processor 310 may operate in the active state. The normal mode may refer to a mode in which the first processor 310 delivers, to the display driving circuit 320, information on a content to be displayed on the display panel 330. The AOD mode may refer to a mode for displaying a screen on the display panel 330 while the first processor 310 is in an inactive mode. An inactive state may refer to a turn-off state which requires booting for switching to an active state. The inactive state may refer to a state in which the PMIC (not illustrated) of the electronic device 300 stops supply of power to the first processor 310. The inactive state may refer to a state in which the first processor 310 does not require booting to switch to the active state but requires acquisition of steady-state power from the PMIC. The inactive state may refer to a state in which power lower than reference power is acquired from the PMIC of the electronic device 300. The inactive state may include at least one of an idle state, a standby state, or a low-power state. The AOD mode may refer to a mode in which the first processor 310 is in an inactive state during at least a part of a period for displaying a screen on the display panel 330. The AOD mode may refer to a state in which power is acquired from an internal power source of the display driving circuit 320. The first processor 310 may identify whether to change a driving mode of the electronic device 300 from a normal mode to an AOD mode, or may identify whether to change a driving mode of the electronic device 300 from an AOD mode to a normal mode. For example, the first processor 310 may monitor whether a user input has been detected for a designated time, by using a timer included in the electronic device 300, and may maintain a normal mode as the driving mode based on identifying of detection of the user input for the designated time. The first processor 310 may change the driving mode to an AOD mode based on identifying of non-detection of the user input for the designated time. As another example, the first processor 310 may monitor whether a user input for deactivation of the display panel 330 of the electronic device 300 has been detected, and may change the driving mode from a normal mode to an AOD mode based on identifying of detection of the user input for deactivation of the display panel 330. However, the disclosure is not limited thereto.

In various embodiments, the first processor 310 may provide or transmit information, which represents switching of the driving mode of the electronic device 300 to an AOD mode, to the display driving circuit 320 based on identifying that a screen mode is to be changed to the AOD mode. For example, the information, which represents switching of the driving mode of the electronic device 300 to the AOD mode, may be stored in a register (not illustrated), a side memory (not illustrated), or a Graphic Random Access Memory (GRAM) 322 included in the display driving circuit 320.

In various embodiments, the first processor 310 may provide or transmit, to the display driving circuit 320, information on a content to be displayed on the display panel 330 while the electronic device 300 operates in an AOD mode, based on identifying that a screen mode is to be changed to the AOD mode. The content may include at least one of an image, text, a visual object, or indication. The information on the content may include control information for display of the content on the display panel 330. The information on the content may be compressed so as to be transmitted to the display driving circuit 320. The information on the content may be stored in the GRAM 322 included in the display driving circuit 320. In other words, the first processor 310 may write the information on the content to the GRAM 322. The information on the content may be transmitted together with, or independently of, the information which represents switching of a driving mode of the electronic device 300 to the AOD mode. For example, when the information on the content is transmitted independently of the information which represents switching of a driving mode of the electronic device 300 to the AOD mode, the information on the content may be transmitted via another path distinguished from a path for transmission of the information which represents switching of the driving mode thereof to the AOD mode. As another example, when the information on the content is transmitted independently of the information which represents switching of the driving mode thereof to the AOD mode, the information on the content may be transmitted via the same path as a path for transmission of the information which represents switching of the driving mode thereof to the AOD mode, at another time point distinguished from a time point of transmission of the information which represents switching of the driving mode thereof to the AOD mode.

In various embodiments, the first processor 310 may provide or transmit, to the display driving circuit 320, information on at least one visual object to be provided together with the content to be displayed on the display panel 330 while the electronic device 300 operates in an AOD mode, based on identifying that a screen mode is to be changed to the AOD mode. In various embodiments, the at least one visual object may be added to the content. While the first processor 310 is in an inactive state, the display driving circuit 320 may display the content having the at least one visual object added thereto on the display panel 330. In various embodiments, the at least one visual object may be superimposed on the content. While the first processor 310 is in the inactive state, the display driving circuit 320 may display the at least one visual object, superimposed on the content, on the display panel 330. For example, when the content is a watch, the at least one visual object may include at least one of a visual object representing hours (an hour hand or a number), a visual object representing minutes (a minute hand or a number), or a visual object representing seconds (a second hand or a number). In various embodiments, information on the at least one visual object may be stored in the GRAM 322 included in the display driving circuit 320. An area which is included in the GRAM 322 and in which the information on the at least one visual object is stored may be distinct from an area which is included in the GRAM 322 and in which the information on the content is stored. In various embodiments, the information on the at least one visual object may be stored in a side memory (not illustrated) included in the display driving circuit 320. The side memory may be distinct from the GRAM 322.

In various embodiments, the first processor 310 may transmit control information of the at least one visual object based on identifying that a screen mode is to be changed to the AOD mode. The control information may include arrangement information. The arrangement information may include data of coordinates of a position at which display of each of the at least one visual object is started, and data of a size of each of the at least one visual object. The data of the size of each of the at least one visual object may include at least one of data of a width of the at least one visual object, or data of a height of the at least one visual object. According to embodiments, the control information may further include time information and the like. The control information may be stored in a register, the side memory, or the GRAM 322 of the display driving circuit 320.

In various embodiments, the first processor 310 may provide or transmit, to the display driving circuit 320, information representing an initial position of the content to be displayed on the display panel 330 while the electronic device 300 operates in an AOD mode, based on identifying that a screen mode is to be changed to the AOD mode. Coordinate information may be configured as information representing the initial position of the content. The coordinate information may represent a display position of a corner of an upper left end of the content in an entire area of the display panel 330. For example, when a horizontal axis of the display panel 330 is defined as an x-axis and a vertical axis of the display panel 330 is defined as a y-axis, the coordinate information may be configured in a format such as (x, y). For example, the information representing the initial position of the content may be stored in a register, the side memory, or the GRAM 322 included in the display driving circuit 320.

In various embodiments, the first processor 310 may provide or transmit, to the display driving circuit 320, information representing multiple positions for movement of the content to be displayed on the display panel 330 while the electronic device 300 operates in an AOD mode, based on identifying that a screen mode is to be changed to the AOD mode. In some embodiments, information representing multiple positions for movement of the content may be configured as absolute coordinates representing the multiple positions for movement of the content with reference to a reference point. For example, when an initial position of the content is (150, 200), the multiple positions for movement of the content may be represented as (151, 201), (150, 201), (150, 202), and the like. In some other embodiments, information representing positions for movement of the content may be configured as relative coordinates representing a relationship between a current position of the content and a next position of the content. In other words, the information representing the positions for movement of the content may be configured as multiple offsets. For example, in an example in which the initial position of the content is (150, 200), the multiple positions for movement of the content may be configured as (1, 1), (−1, 0), (0, 1), and the like, which represent the multiple offsets. Information representing multiple positions for movement of the content to be displayed on the display panel 330 while the electronic device 300 operates in the AOD mode may be stored in a register, the side memory, or the GRAM 322 included in the display driving circuit 320.

In various embodiments, the first processor 310 may provide or transmit, to the display driving circuit 320, information representing a designated periodicity used to move the content to be displayed on the display panel 330 while the electronic device 300 operates in an AOD mode, based on identifying that a screen mode is to be changed to the AOD mode. The display driving circuit 320 may change a position of the content at every periodicity at least based on the information representing the designated periodicity used to move the content to be displayed on the display panel 330 while the electronic device 300 operates in the AOD mode. For example, when the designated periodicity is 1 minute, the display driving circuit 320 may change a position of the content at every 1 minute while the electronic device 300 operates in the AOD mode. The information representing the designated periodicity of movement of the content to be displayed on the display panel 330 while the electronic device 300 operates in the AOD mode may be stored in a register, the side memory, or the GRAM 322 included in the display driving circuit 320.

In various embodiments, information representing switching of a driving mode of the electronic device 300 to the AOD mode, information representing an initial position of a content, information representing multiple positions for movement of the content, information representing a designated periodicity of movement of the content, and information representing another designated periodicity of movement of at least one visual object may be configured as in Table 1 below.

TABLE 1

| Command | Function | Description |
| --- | --- | --- |
| first parameter | indicates switching to AOD mode | represents that self-movement of content is to be started |
| second parameter | indicates initial position | represents x-coordinate of initial position |
| third parameter | indicates initial position | represents x-coordinate of initial position |
| fourth parameter | indicates initial position | represents y-coordinate of initial position |
| fifth parameter | indicates initial position | represents y-coordinate of initial position |
| sixth parameter | indicates designated periodicity | is configured with eight bits; bits corresponding to [7:4] represent movement periodicity of content; and bits corresponding to [3:0] represent movement periodicity of visual object |
| seventh parameter | indicates offset for first movement | Each parameter is configured with six bits; bits corresponding to [1:0] represent variance of |
| eighth parameter | indicates offset for second movement | offset of y-coordinate; bits corresponding to |
| ninth parameter | indicates offset for second movement | [2] represent change direction (+/−) of offset |
| 10th parameter | indicates offset for second movement | of y-coordinate; bits |
| 11th parameter | indicates offset for second movement | corresponding to [3:4] represent variance of |
| ... | ... | |
| ... | ... | |
| 65th parameter | indicates offset for 59th movement | offset of x-coordinate; and bits corresponding to [5] represent change direction (+/−) of offset of x-coordinate. |

For example, an example of information provided in Table 1 may be configured as in Table 2 below.

TABLE 2

| Command | Function | Description |
| --- | --- | --- |
| first parameter | 1 | represents that self-movement of content is to be started |
| second parameter and third parameter | {0, 150} | Initial position at which content is displayed |
| fourth parameter fifth parameter | {0, 500} | corresponds to (150, 500). |
| sixth parameter | {0001, 0001} | Content and at least one visual object are moved at every one-minute interval by display driving circuit. |
| seventh parameter | {1, 2, 0, 1} | Offset of x-coordinate of movement of content is set to −2; offset of y-coordinate of movement of content is set to +1. That is, position for movement of content after initial display of content corresponds to (148, 501). |
| eighth parameter | {1, 3, 1, 3} | Offset of x-coordinate of movement of content is set to −3, and offset of y-coordinate of movement of content is set to −3. |

TABLE 2-continued

| Command | Function | Description |
|---|---|---|
| | | That is, position for movement of content after content is displayed at (148, 501) corresponds to (145, 498). |
| ninth parameter | {0, 1, 1, 2} | Offset of x-coordinate of movement of content is set to +1, and offset of y-coordinate of movement of content is set to −2. That is, position for movement of content after content is displayed at (145, 498) corresponds to (149, 496). |
| ... | ... | ... |
| ... | ... | ... |

In various embodiments, after the first processor 310 transmits: information on the content to be displayed on the display panel 330 while the electronic device 300 operates in the AOD mode; information representing an initial position of the content; information representing multiple positions for movement of the content; and information representing a designated periodicity of movement of the content, the first processor 310 may switch a state thereof to an inactive state. The first processor 310 may switch a state thereof to the inactive state in order to enter the AOD mode.

In various embodiments, after a first designated time passes from a first time point of switching to the inactive state, the first processor 310 may switch a state thereof to an active state. Even when an input for terminating or releasing the AOD mode is not detected for the first designated time from the first time point, the first processor 310 may switch a state thereof to the active state. In response to switching to the active state, the first processor 310 may transmit, to the display driving circuit 320, information on a position for display of a content and information on multiple positions for movement of the content. The position for display of the content may be in proximity to a position of the content immediately before the first processor 310 switches to the active state. At least some of the multiple positions for movement of the content may be different from at least some of multiple positions at which the content has been displayed while the first processor 310 is in the inactive state. In various embodiments, in order for the first processor 310 to prevent timing distortion which may be caused by switching a driving mode from an AOD mode to a normal mode, the first processor 310 may switch a state thereof to the active state after the first designated time passes from the first time point, and may transmit, to the display driving circuit 320, the information on the position for display of the content and the information on the multiple positions for movement of the content. Switching of a state of the first processor 310 to the active state and transmission by the first processor 310 will be described in detail below with reference to FIG. 9 and FIG. 10. In various embodiments, at a second time point at which the information on the position for display of the content and the information on the multiple positions for movement of the content are transmitted, the first processor 310 may switch a state thereof to the inactive state.

In various embodiments, the first processor 310 may switch a state thereof to the active state after a second designated time longer than the first designated time passes from the first time point. Even when an input for terminating or releasing the AOD mode is not detected for the second designated time from the first time point, the first processor 310 may switch a state thereof to the active state. In response to switching to the active state, the first processor 310 may transmit, to the display driving circuit 320, the information on the position for display of the content and the information on the multiple positions for movement of the content. The position for display of the content may be spaced by a designated distance from a position of the content immediately before the first processor 310 switches to the active state. At least some of the multiple positions for movement of the content may be different from at least some of multiple positions at which the content has been displayed while the first processor 310 is in the inactive state. Switching of a state of the first processor 310 to the active state and transmission by the first processor 310 will be described in detail below with reference to FIG. 9 and FIG. 10. In various embodiments, at a third time point at which the information on the position for display of the content and the information on the multiple positions for movement of the content are transmitted, the first processor 310 may switch a state thereof to the inactive state.

In various embodiments, the display driving circuit 320 may receive or acquire, from the first processor 310, information which represents switching of a driving mode of the electronic device 300 to an AOD mode. The display driving circuit 320 may store the information, which represents switching of the driving mode of the electronic device 300 to the AOD mode, in a register, the side memory, or the GRAM 322 included in the display driving circuit 320. The display driving circuit 320 may identify self-movement of a content to be displayed on the display panel 330 while the electronic device 300 operates in the AOD mode, based on reception of the information.

In various embodiments, the display driving circuit 320 may receive or acquire, from the first processor 310, information on a content to be displayed on the display panel 330 while the electronic device 300 operates in the AOD mode. The display driving circuit 320 may receive, from the first processor 310, the information on the content transmitted together with an instruction of a first instruction group. The instruction of the first instruction group may include at least one of a write start instruction (write_memory_start) for starting writing of data to the GRAM 322 or a write continue instruction (write_memory_continue) for continuing writing of data to the GRAM 322. The write start instruction may include an instruction having a code of 2Ch according to a Mobile Industry Processor Interface (MIPI) standard, and the write continue instruction may include an instruction having a code of 3Ch according to the MIPI standard. The display driving circuit 320 may store or write the information on the received content in or to the GRAM 322 at least based on the write start instruction or the write continue instruction. While the first processor 310 is in an inactive state, the display driving circuit 320 may display the content on the display panel 330 by using the second processor 321.

FIG. 3 illustrates an example in which the display driving circuit 320 includes the second processor 321, but this configuration is only for convenience of description. The second processor 321 may be disposed outside of the display driving circuit 320. For example, the second processor 321 may include at least one of a sensor hub, a Communication Processor (CP), or a Touch Screen Panel (TSP) Integrated Circuit (IC).

In various embodiments, the second processor 321 may switch to an active state or an inactive state according to a state of the electronic device 300. A periodicity in which the second processor 321 switches a state of the second processor 321 may be shorter than a periodicity in which the first processor 310 switches a state of the first processor 310. While the first processor 310 operates in an inactive state, the display driving circuit 320 may change a display position of a content at every designated periodicity by using the second processor 321.

In various embodiments, the display driving circuit 320 may receive or acquire, from the first processor 310, information on at least one visual object to be provided together with the content to be displayed on the display panel 330 while the electronic device 300 operates in the AOD mode. The display driving circuit 320 may receive, from the first processor 310, information on at least one visual object transmitted together with an instruction of a second instruction group. The instruction of a second instruction group may include at least one of a write start instruction for starting writing of data to the GRAM 322 or a write continue instruction for continuing writing of data to the GRAM 322. The write start instruction may include one or more of instructions having codes of 00h to FFh except for 2Ch and 3Ch according to the MIPI standard, and the write continue instruction may include one or more of instructions having codes of 00h to FFh except for 2Ch, 3Ch, and an instruction assigned to the write start instruction according to the MIPI standard. In various embodiments, the display driving circuit 320 may store or write the information on the at least one visual object in or to the GRAM 322 at least based on the write start instruction or the write continue instruction. A position at which information on the at least one visual object is stored in the GRAM 322 may be distinct from a position at which information on the content is stored in the GRAM 322. In various embodiments, the display driving circuit 320 may store or write the information on the at least one visual object in or to a side memory, which is distinct from the GRAM 322, at least based on the write start instruction or the write continue instruction.

In various embodiments, the display driving circuit 320 may insert, add, or include at least one visual object into, to, or in the content by using the second processor 321. In other words, the display driving circuit 320 may generate a new content, which includes the at least one visual object and the content, by using the second processor 321. While the first processor 310 is in an inactive state, the display driving circuit 320 may display the new content on the display panel 330 by using the second processor 321. While the first processor 310 is in the inactive state, the display driving circuit 320 may refine configuration of the at least one visual object at every designated periodicity by using the second processor 321. The display driving circuit 320 may generate another new content, which includes the content and at least one visual object having the configuration refined at every designated periodicity, by using the second processor 321. While the first processor 310 is in the inactive state, the display driving circuit 320 may change a display position of the another new content at every designated periodicity by using the second processor 321.

In various embodiments, while the first processor 310 is in the inactive state, the display driving circuit 320 may display the at least one visual object, superimposed on the content, on the display panel 330 by using the second processor 321. In other words, the display driving circuit 320 may independently process each of the content and the at least one visual object. While the first processor 310 is in the inactive state, the display driving circuit 320 may refine configuration of the at least one visual object at every designated periodicity by using the second processor 321. While the first processor 310 is in the inactive state, the display driving circuit 320 may change a display position of the content, and a display position of at least one visual object having the refined configuration at every designated periodicity by using the second processor 321.

In various embodiments, the display driving circuit 320 may receive or acquire, from the first processor 310, control information for the at least one visual object. The display driving circuit 320 may write or store the control information to or in a register, the side memory, or the GRAM 322 within the display driving circuit 320. The display driving circuit 320 may display the at least one visual object by using the second processor 321 at least based on the control information. For example, the second processor 321 may include a drawing engine configured to display the at least one visual object based on the control information. While the first processor 310 is in the inactive state, the display driving circuit 320 may change a position of the at least one visual object displayed based on the control information at every designated periodicity by using the second processor 321.

In various embodiments, the display driving circuit 320 may receive, from the first processor 310, information representing an initial position of a content to be displayed on the display panel 330 while the electronic device 300 operates in the AOD mode. The display driving circuit 320 may write or store the information representing the initial position of the content to or in a register, the side memory, or the GRAM 322 within the display driving circuit 320. The display driving circuit 320 may display the content at the initial position on the display panel 330 by using the second processor 321. While the first processor 310 operates in the inactive state, the display driving circuit 320 may change a display position of the content at every designated periodicity by using the second processor 321.

In various embodiments, the display driving circuit 320 may receive or acquire, from the first processor 310, information representing multiple positions for movement of the content to be displayed on the display panel 330 while the electronic device 300 operates in the AOD mode. The display driving circuit 320 may store the information representing the multiple positions in a register, the side memory, or the GRAM 322 within the display driving circuit 320. The display driving circuit 320 may identify, by using the second processor 321, a position of the content to be moved at every designated periodicity at least based on the information representing the multiple positions. While the first processor 310 operates in the inactive state, the display driving circuit 320 may change a display position of the content at every designated periodicity based on identifying of the position of the content. In various embodiments, the display driving circuit 320 may identify the at least one visual object to be moved at every designated periodicity, from the information representing the multiple positions by using the second processor 321. While the first processor 310 operates in the inactive state, the display driving circuit 320 may change a display position of the at least one visual object at every designated periodicity based on identifying of the at least one visual object.

In various embodiments, the display driving circuit 320 may receive or acquire, from the first processor 310, information representing a designated periodicity of movement of the content and/or the at least one visual object to be displayed on the display panel 330 while the electronic device 300 operates in the AOD mode. The display driving circuit 320 may store the information representing the designated periodicity in a register, the side memory, or the GRAM 322 within the display driving circuit 320. While the first processor 310 is in the inactive state, the display driving circuit 320 may change a display position of the content (and/or the at least one visual object) by using the second processor 321 based on the designated periodicity.

In various embodiments, the display driving circuit 320 may receive or acquire, from the first processor 310, information on a position for display of the content and information on multiple positions for movement of the content, from the first processor 310 which switches to the active state after a first designated time passes from the first time point of switching to the inactive state. The display driving circuit 320 may store the information on the position for display of the content and the information on the multiple positions for movement of the content, in a register, the side memory, or the GRAM 322 within the display driving circuit 320. Based on information on a position for display of the content, the display driving circuit 320 may display the content at the position by using the second processor 321 while the first processor 310 is in the inactive state, and may then change a display position of the content based on the information on the multiple positions for movement of the content.

In various embodiments, the display driving circuit 320 may receive or acquire information on a position for display of the content and information on multiple positions for movement of the content, from the first processor 310 which switches to the active state after a second designated time longer than the first designated time passes from the first time point. The display driving circuit 320 may store the information on the position for display of the content and the information on the multiple positions for movement of the content, in a register, the side memory, or the GRAM 322 within the display driving circuit 320. Based on information on a position for display of the content, the display driving circuit 320 may display the content at the position by using the second processor 321 while the first processor 310 is in the inactive state, and may then change a display position of the content based on the information on the multiple positions for movement of the content.

As described above, while a driving mode is the AOD mode, the electronic device 300 according to various embodiments may change a display position of a content by using not the first processor 310 but the display driving circuit 320.

Figure 4:
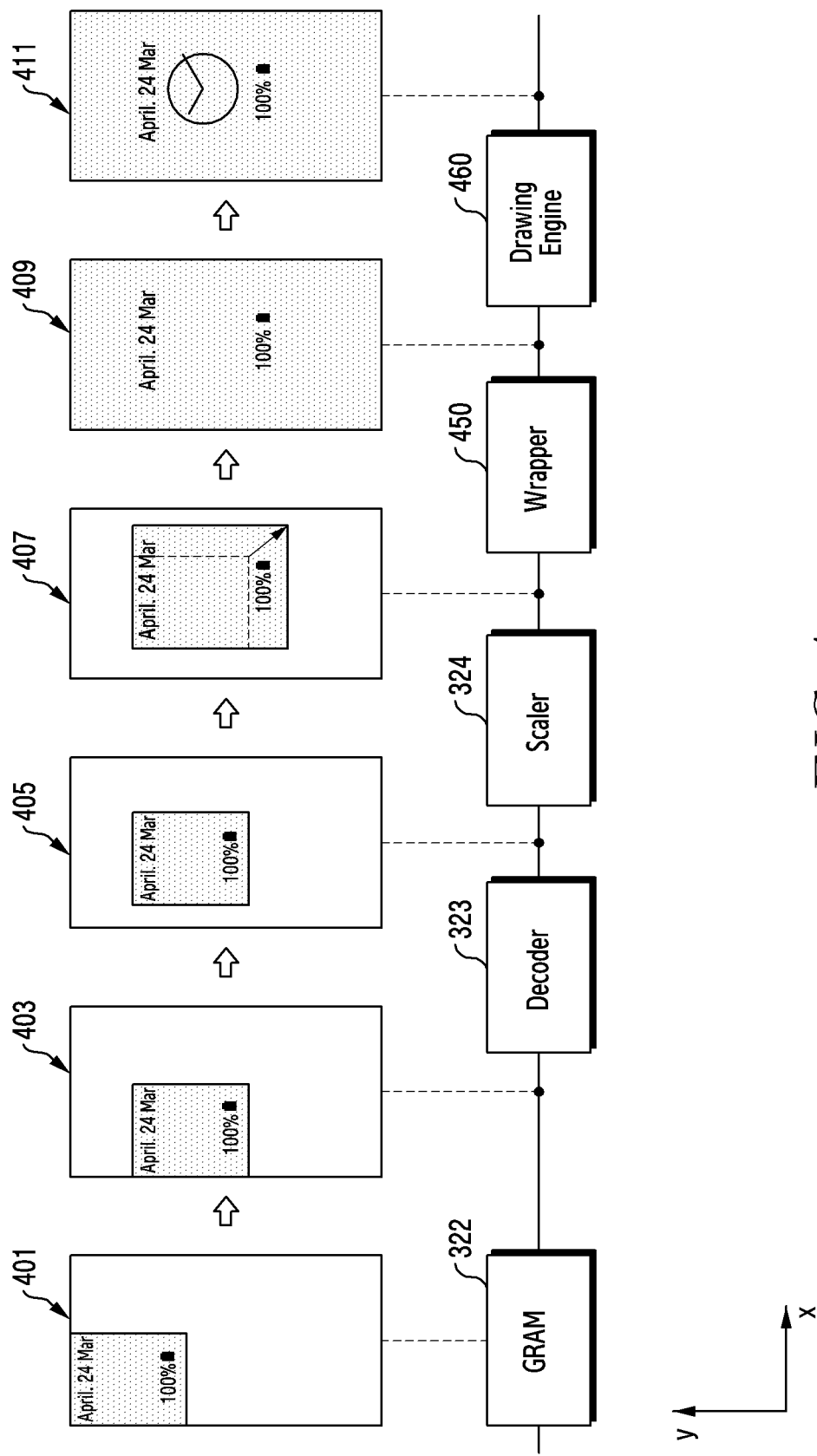
FIG. 4 illustrates an example of a method for displaying an image during provision of an AOD mode in an electronic device according to various embodiments.

For example, referring to FIG. 4, the display driving circuit 320 may store the information on the content, received from the first processor 310, in the GRAM 322. The information on the content may be stored in a first area of the GRAM 322. When the display driving circuit 320 displays the content, stored in the first area, without separate processing, the display driving circuit 320 may display a screen 401 including the content, in a second area corresponding to the first area. The second area may be different from an area related to an initial position of the content indicated by the first processor 310. The display driving circuit 320 may scan for or read the content stored in the first area of the GRAM 322 at least based on information on the initial position, and thus may acquire the content moved in a first direction. For example, when the display driving circuit 320 displays the content moved in the first direction, the display driving circuit 320 may display a screen 403 including the content, in a third area moved from the second area in the first direction. A y-axis coordinate of a corner of an upper left end of the third area may correspond to a y-axis coordinate of the initial position.

When the content is compressed by the first processor 310, a decoder 323 of the display driving circuit 320 may decode the content, moved in the first direction, in order to decompress the compressed content. The decoder 323 of the display driving circuit 320 may decode the content, moved in the first direction, at least based on the information on the initial position, and thus may acquire the content moved in the first direction and the second direction. For example, when the display driving circuit 320 displays the content moved in the first direction and the second direction, the display driving circuit 320 may display a screen 405 including the content, in a fourth area moved from the third area in the second direction. An x-axis coordinate and a y-axis coordinate of a corner of an upper left end of the fourth area may correspond to an x-axis coordinate and a y-axis coordinate of the initial position, respectively. Decompression performed by the decoder 323 may be omitted when the content is written to the GRAM 322 in a state of being uncompressed. In this example, the display driving circuit 320 may bypass the decompression, and may perform only movement in the second direction.

FIG. 4 illustrates an example in which movement in the first direction is performed in an operation of scanning the GRAM 322 for the content and movement in the second direction is performed in an operation of decoding the content, but this configuration is only for convenience of description. It should be noted that movement in the first direction and movement in the second direction may be performed in separate operations or may be performed at a certain time point in an operation of scanning the GRAM 322 for the content and displaying the scanned content on the display panel 330.

In order to display the content, moved in the first direction and the second direction, on the display panel 330, a scaler 324 of the display driving circuit 320 may scale the content moved in the first direction and the second direction. For example, when the display driving circuit 320 displays the scaled content, the display driving circuit 320 may display a screen 407 including the scaled content.

A wrapper 450 of the display driving circuit 320 may generate an image to be displayed in the remaining area except for an area, in which the scaled content is displayed, in an entire area of the display panel 330. For example, the wrapper 450 may generate an image having a color corresponding to the scaled content, as an image to be displayed in the remaining area. Information on the color corresponding to the scaled content may be provided by the first processor 310. For example, information on the color, together with information on the content, may be provided from the first processor 310 to the display driving circuit 320. As another example, information on the color may be provided from the first processor 310 to the display driving circuit 320, independently of provision of information on the content. For example, when a representative color of the content is a black color, an image to be displayed in the remaining area may be configured to have the black color corresponding to the representative color of the content. For example, when the display driving circuit 320 displays the image and the content, the display driving circuit 320 may display a screen 409 including the image and the content. In various embodiments, the wrapper 450 may generate a new content by synthesizing the image and the content, or may independently process the image and the content. When the wrapper 450 independently processes the image and the content, the display driving circuit 320 may display the content superimposed on the image. In this example, an area, in which the image is displayed, may correspond to the entire area of the display panel 330.

A drawing engine 460 of the display driving circuit 320 may include or insert at least one visual object in or into the content having the image inserted therein. According to embodiments, the drawing engine 460 may be an element which is included in the display driving circuit 320 and is distinct from the second processor 321, or may be an element included in the second processor 321. The drawing engine 460 may insert the at least one visual object into the content at least based on a position of an area (i.e., a fourth area), in which the content is displayed, and control information for the at least one visual object. For example, the display driving circuit 320 may display, on the display panel 330, a screen 411 including the content including the at least one visual object. According to embodiments, the at least one visual object may be independent of the content. For example, the display driving circuit 320 may also display, on the display panel 330, the screen 411 including the at least one visual object superimposed on the content.

The display driving circuit 320 may acquire information on a time elapsing since display of the screen 411, by using a timer 325. According to embodiments, the second processor 321 or the drawing engine 460 may include the timer 325. The timer may refer to a module configured to generate a clock signal. The timer may be referred to as a "clock signal generator". While the first processor 310 is in an inactive state, the display driving circuit 320 may change a display position of the content (and/or the at least one visual object) at every designated periodicity at least based on the information on the time. For example, the display driving circuit 320 may identify respective positions for movement of the content by using multiple offsets provided by the first processor 310, and may move the content according to identifying of the respective positions based on the designated periodicity.

As described above, while operating in the AOD mode, the electronic device 300 according to various embodiments may bypass or prevent switching to the active state in order to control movement of the content displayed while the first processor 310 is in the AOD mode, by using a timer within the display driving circuit 320. This bypass or prevention enables the electronic device 300 to reduce the power consumed by the first processor 310.

An electronic device according to the above-described various embodiments may include: a display panel; a processor; and a display driving circuit including an internal memory and configured to be capable of driving the display panel, wherein the display driving circuit is configured to: while the processor operates in an active state, receive, from the processor, coordinate information of a designated content to be displayed on the display panel while the processor operates in a low-power state; store the coordinate information in the internal memory; display the designated content at a first position on the display panel while the processor operates in the low-power state; and move the designated content displayed at the first position to a second position on the display panel and display the designated content at the second position, at least based on the coordinate information stored in the internal memory while the processor operates in the low-power state.

In various embodiments, the display driving circuit may be configured to: output the designated content on the display panel; and display a designated color in at least a part of an area in which the designated content is not displayed in an entire area of the display panel. In some embodiments, the designated color may be configured as a representative color of the designated content.

In various embodiments, the display driving circuit may be configured to move the content, displayed at the first position, at every designated periodicity based on the coordinate information while the processor operates in the low-power state.

In various embodiments, the designated content may include an image.

In various embodiments, the display driving circuit may be configured to, while the processor operates in the low-power state, move the designated content, displayed at the first position, at every designated periodicity at least based on the coordinate information in a first designated time, so as to display the content at the second position in proximity to the first position, and the processor may be further configured to: switch to the active state after a first designated time passes from a time point of switching to the low-power state; transmit information on a third position for display of the content in response to switching to the active state; and switch to the low-power state after transmitting the information on the third position. Also, the display driving circuit may be further configured to display the content at the third position based on reception of the information on the third position from the processor. In some embodiments, the display driving circuit may be further configured to, while the processor operates in the low-power state, move the content displayed at the third position at every designated periodicity in the first designated time so as to display the content at a fourth position in proximity to the third position.

In various embodiments, the processor may be further configured to switch to the active state after a second designated time passes from a time point of transmission of information on the first position, transmit information on a third position for display of the content, and switch to the low-power state after transmitting the information on the third position; and the third position may be spaced by a designated distance from the first position and the second position. In some embodiments, a pixel distance between the first position and the third position may be longer than a pixel distance between the first position and the second position, and a pixel distance between the second position and the third position may be longer than the pixel distance between the first position and the second position.

An electronic device according to the above-described various embodiments may include: a display panel; a processor; and a display driving circuit including an internal memory and configured to be capable of driving the display panel, wherein the display driving circuit is configured to: receive, from the processor, movement information of a designated content to be displayed on the display panel while the processor operates in a low-power state; store the movement information in the internal memory; display the designated content at a first position on the display panel while the processor operates in the low-power state; and move the designated content displayed at the first position to a second position on the display panel and display the designated content at the second position, at least based on the movement information stored in the internal memory while the processor operates in the low-power state.

In various embodiments, the movement information may include coordinate information of the second position.

In various embodiments, the movement information may include at least one piece of information among coordinate information of the first position, coordinate information of the second position, and one or more pieces of offset information. For example, the display driving circuit may be configured to: while the processor operates in the low-power state, change a display position of the content based on the one or more pieces of offset information; and display the content based on the changed display position. For example, the one or more pieces of offset information may be used to represent a difference between the first position and the second position.

An electronic device according to the above-described various embodiments may include: a display driving circuit including a timer and configured to be functionally coupled to a display panel; and a processor configured to be functionally coupled to the display driving circuit, wherein the processor is configured to switch a state of the processor to an inactive state based on providing the display driving circuit with information on an image, and the display driving circuit is configured to: while the processor is in the inactive state, display the image on the display panel and acquire, via the timer, information on a time elapsing since display of the image; and change a display position of the image at every designated periodicity based on the information on the time while the processor is in the inactive state.

In various embodiments, the processor may be configured to switch the state of the processor to the inactive state based on providing the display driving circuit with the information on the image and information on a first position for display of the image; and the display driving circuit may be configured to display the image at the first position while the processor is in the inactive state.

In various embodiments, the processor may be configured to switch the state of the processor to the inactive state based on providing the display driving circuit with the information on the image and information representing the designated periodicity.

In various embodiments, the processor may be configured to switch the state of the processor to the inactive state based on providing the display driving circuit with the information on the image and information on multiple offsets used to change the display position of the image; and the display driving circuit may be configured to change the display position of the image at every designated periodicity by using the multiple offsets based on the information on the time while the processor is in the inactive state. In some embodiments, the display driving circuit may be configured to: identify a position for display of the image by using one offset among the multiple offsets at every designated periodicity; and change the display position of the image at every designated periodicity by using the information on the time based on identifying of the position while the processor is in the inactive state.

In various embodiments, the display driving circuit may further include another processor, a first Graphic Random Access memory (GRAM), and a second GRAM; and the another processor may include the timer, wherein the display driving circuit is configured to: store, in the first GRAM, the information on the image acquired from the processor; identify one or more visual objects to be related to the image from information on multiple visual objects stored in the second GRAM by using the another processor while the processor is in the inactive state; while the processor is in the inactive state, display the image together with the one or more visual objects on the display panel, and acquire, via the timer, the information on the time elapsing since display of the image; and while the processor is in the inactive state, change a display position of the image and the one or more visual objects at every designated periodicity based on the information on the time, and change a state of at least one visual object among the one or more visual objects at every designated periodicity. In some embodiments, the state of the at least one visual object may include a display angle of the at least one visual object.

In various embodiments, the processor may be further configured to: receive a signal representing detection of an input for changing a mode of the display panel from a first mode to a second mode while the processor is in the inactive state; switch the state of the processor from the inactive state to an active state based on reception of the signal; and while the processor is in the active state, control the display driving circuit so as to display another image distinct from the image on the display panel.

In various embodiments, the processor may be configured to switch the state of the processor to the inactive state based on providing the display driving circuit with the information on the image, information on a first position for display of the image, and information for moving the image from the first position; the display driving circuit may be configured to display the image at the first position and acquire information on a time elapsing since display of the image via the timer while the processor is in the inactive state, and while the processor is in the inactive state, change the display position of the image at every designated periodicity at least based on the information on the time and the information for moving the image from the first position, so as to move the content to a second position in proximity to the first position; and the processor may be further configured to switch the state of the processor to the active state after a designated time passes from a time point of switching of the state of the processor to the inactive state, and provide, in response to switching to the active state, the display driving circuit with information on a third position for display of the content.

Figure 5A:
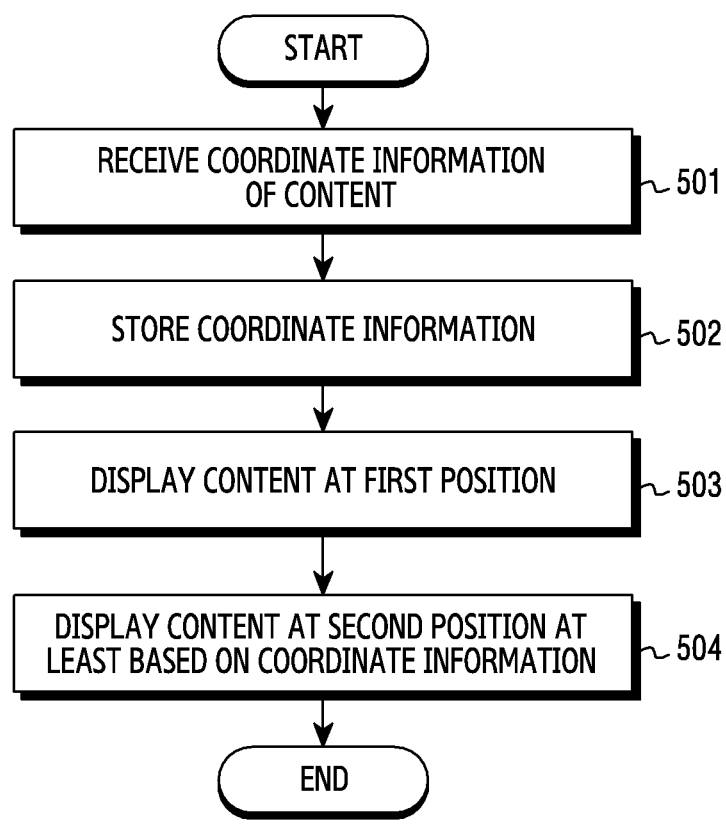
FIG. 5A illustrates an example of an operation of an electronic device according to various embodiments.

FIG. 5A illustrates an example of an operation of an electronic device according to various embodiments. The operation may be performed by the electronic device 101 illustrated in FIG. 1, the electronic device 300 illustrated in FIG. 3, the display apparatus 160 of the electronic device 101, or the display driving circuit 320 of the electronic device 300.

Referring to FIG. 5A, in operation 501, while the first processor 310 operates in an active state, the display driving circuit 320 may receive, from the first processor 310, coordinate information of a content to be displayed on the display panel 330 while the first processor 310 operates in a low-power state. Reference may be made to the coordinate information as movement information. The coordinate information may be used to change a display position of the content by the display driving circuit 320 while the first processor 310 operates in the low-power state. The coordinate information may include data representing a position of the content to be changed at every designated periodicity. The coordinate information may be configured as absolute coordinates, or may be configured as relative coordinates (e.g., an offset) representing a relationship between a previous display position of the content and a next display position thereof. The coordinate information, together with information on the content, may be transmitted by the first processor 310, or may be transmitted by the first processor 310 independently of transmission of information on the content. For example, the coordinate information may be transmitted from the first processor 310 to the display driving circuit 320 via a path independent of a path along which the information on the content is transmitted. As another example, the coordinate information may be transmitted from the first processor 310 to the display driving circuit 320 via the same path as a path along which the information on the content is transmitted, at another time point distinct from a time point at which the information on the content is transmitted.

In operation 502, the display driving circuit 320 may store the coordinate information in an internal memory of the display driving circuit 320. For example, the internal memory may include the GRAM 322. As another example, the internal memory may include a register within the display driving circuit 320. As still another example, the internal memory may include a side memory within the display driving circuit 320. The coordinate information may be used to change a display position of the content by the display driving circuit 320 while the first processor 310 is in the low-power state.

In operation 503, the display driving circuit 320 may display the content at a first position while the first processor 310 operates in the low-power state. Control information, provided to display the content by the first processor 310, may include information on the first position. The control information may be transmitted from the first processor 310 to the display driving circuit 320 via a path independent of a path along which the information on the content is transmitted. As another example, the control information may be transmitted from the first processor 310 to the display driving circuit 320 via the same path as a path along which the information on the content is transmitted, at another time point distinct from a time point at which the information on the content is transmitted. The control information may include the coordinate information. In various embodiments, the display driving circuit 320 may output the content on the display panel 330, and may display a designated color in at least a part of an area in which the content is not displayed in an entire area of the display panel 330. The designated color may include one of multiple colors constituting the content. According to embodiments, the designated color may be configured with multiple colors for the purpose of gradation.

In operation 504, while the first processor 310 operates in the low-power state, the display driving circuit 320 may move the content, displayed at the first position, to a second position and may display the content at the second position, at least based on the coordinate information stored in the internal memory. The coordinate information may include data representing the second position. For example, the coordinate information may include data of absolute coordinates corresponding to the second position. As another example, the coordinate information may include data of relative coordinates representing a difference between the first position and the second position. Reference may be made to the data of the relative coordinates, for example, as an offset.

Figure 5B:
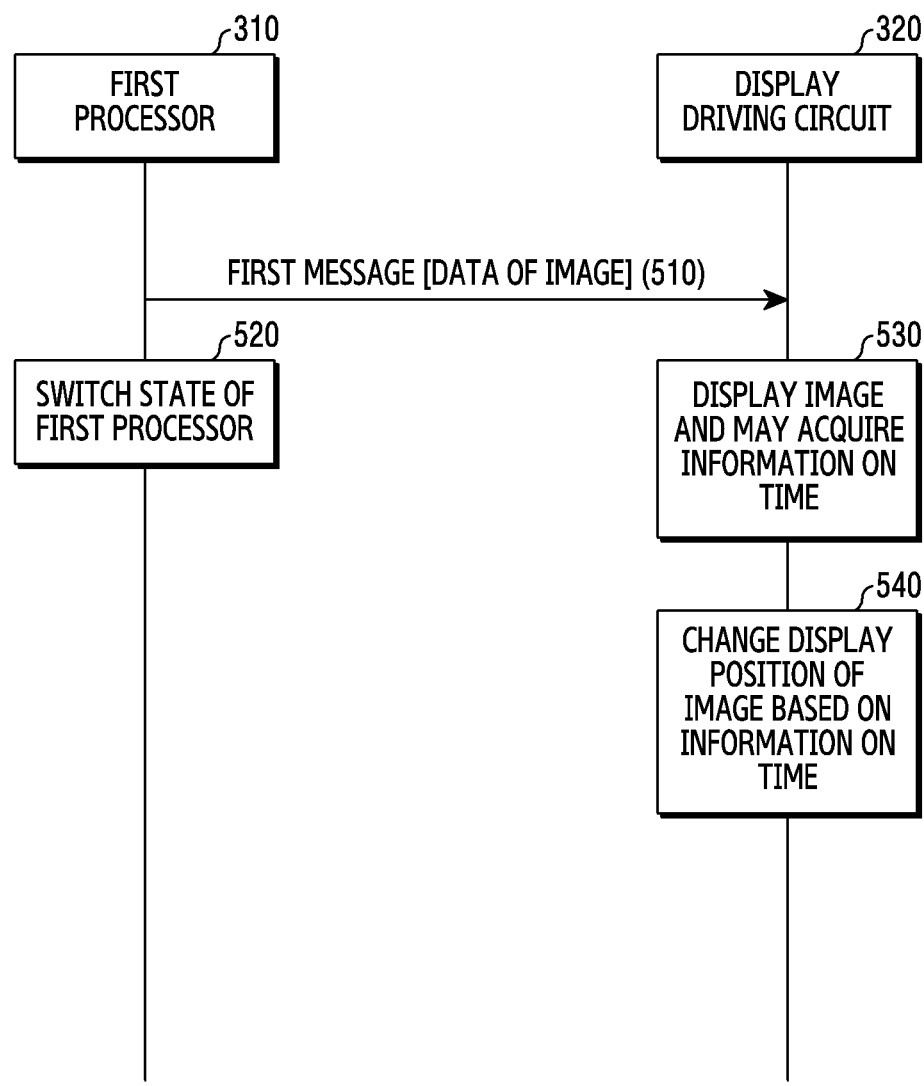
FIG. 5B illustrates another example of an operation of an electronic device according to various embodiments.

FIG. 5B illustrates another example of an operation of an electronic device according to various embodiments. The operation may be performed by the electronic device 101 illustrated in FIG. 1, the elements of the electronic device 101 illustrated in FIG. 1, the electronic device 300 illustrated in FIG. 3, or the elements of the electronic device 300 illustrated in FIG. 3.

Referring to FIG. 5B, in operation 510, the first processor 310 may transmit a first message to the display driving circuit 320. The first message may include data of an image to be displayed on the display panel 330 while the electronic device 300 operates in an AOD mode. The image may be configured in a full frame or a partial frame. The display driving circuit 320 may receive a first message including data of the image. The display driving circuit 320 may acquire data of the image from the first message. The display driving circuit 320 may store the data of the image in the GRAM 322.

In operation 520, the first processor 310 may switch a state thereof. In various embodiments, after transmitting the first message, the first processor 310 may switch a state thereof to an inactive state.

In operation 530, while the first processor 310 is in the inactive state, the display driving circuit 320 may display the image on the display panel 330, and may acquire information on a time elapsing since display of the image by using the timer 325 included in the display driving circuit 320.

In operation 540, while the first processor 310 is in the inactive state, the display driving circuit 320 may change a display position of the image at every designated periodicity based on the information on the time. In order to prevent a burn-in phenomenon, the display driving circuit 320 may change a display position of the image at every designated periodicity based on the information on the time while the first processor 310 is in the inactive state.

As described above, the electronic device 300 according to various embodiments may acquire information on a time elapsing during provision of the AOD mode, by using the timer included in the display driving circuit 320 and configured to generate a clock signal. The electronic device 300 according to various embodiments may move the image displayed on the display panel 330 during provision of the AOD mode based on the acquired information, so as to bypass or prevent switching of a state of the first processor 310 to an active state by the first processor 310 in order to move the image, making it possible to reduce the power consumed by the first processor 310.

Figure 6:
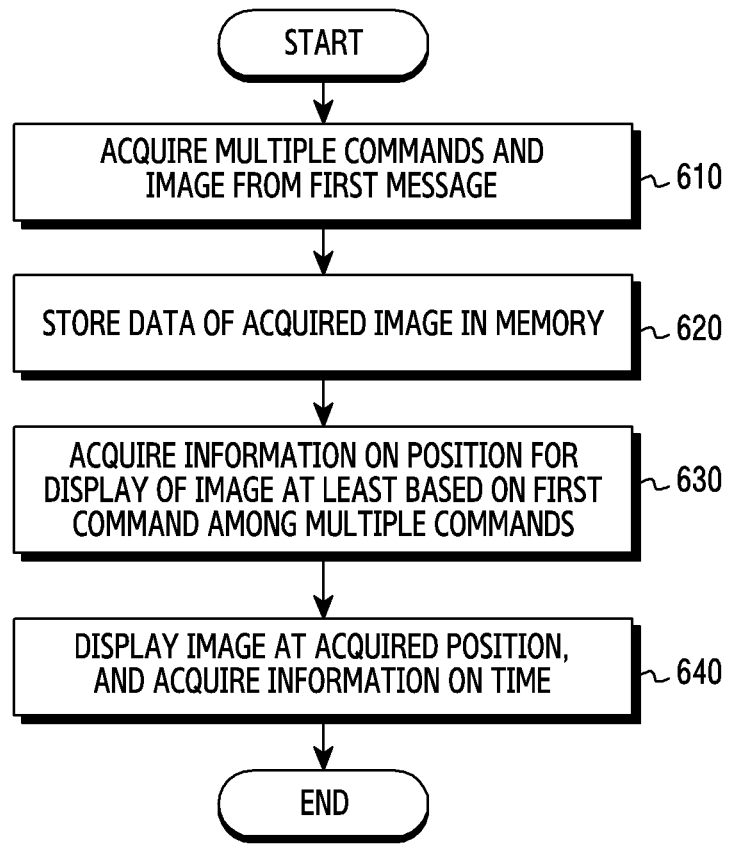
FIG. 6 illustrates an example of an operation of a display driving circuit of an electronic device according to various embodiments.

FIG. 6 illustrates an example of an operation of a display driving circuit of an electronic device according to various embodiments. The operation may be performed by the display driver IC 230 illustrated in FIG. 2 or the display driving circuit 320 illustrated in FIG. 3.

In FIG. 6, the first processor 310 may be in an inactive state while the display driving circuit 320 performs operations 610, 620, 630, and 640.

Operations 610, 620, 630, and 640 of FIG. 6 may be related to operation 530 of FIG. 5B.

Referring to FIG. 6, in operation 610, the display driving circuit 320 may acquire multiple commands and an image from a first message received from the first processor 310 in an active state. For example, the display driving circuit 320 may acquire an image and multiple commands from a first message by using an interface controller within the second processor 321 of the display driving circuit 320. The multiple commands may include a first command indicating an initial position for display of the image after entry to the AOD mode. The initial position may be identified by the first processor 310 based on a characteristic of the image including at least one of: a size of the image; a middle point of the image; a center of gravity of effective pixels included in the image; a ratio of effective pixels of the image; an average pixel value of the image; a maximum pixel value of the image; a deviation of pixel values of the image; a brightness of a display panel on which the image is displayed; an On-Pixel Ratio (OPR) of the image; a cumulative stress value of pixels according to movement of the image; or a spatial frequency of the image.

In operation 620, the display driving circuit 320 may store data of the acquired image in a memory (e.g., the GRAM 322). Meanwhile, the display driving circuit 320 may store information on the multiple commands in a register within the display driving circuit 320.

In operation 630, the display driving circuit 320 may acquire information on a position for display of the image at least based on the first command among the stored multiple commands. For example, the display driving circuit 320 may identify or acquire a position, indicated by the first command, as a position at which the image is to be initially displayed after entry to the AOD mode.

In operation 640, the display driving circuit 320 may display the image at the acquired position, and may acquire information on a time elapsing since display of the image, by using a timer included in the display driving circuit 320.

FIG. 6 illustrates an example in which the first message includes both the multiple commands and the image, but this configuration is only for convenience of description. It should be noted that: the multiple commands may be transmitted from the first processor 310 to the display driving circuit 320 via another path distinct from a path along which the image is transmitted; or the multiple commands may be transmitted from the first processor 310 to the display driving circuit 320 via the same path as a path along which the image is transmitted, at a time point different from a time point at which the first processor 310 transmits the image.

Figure 7:
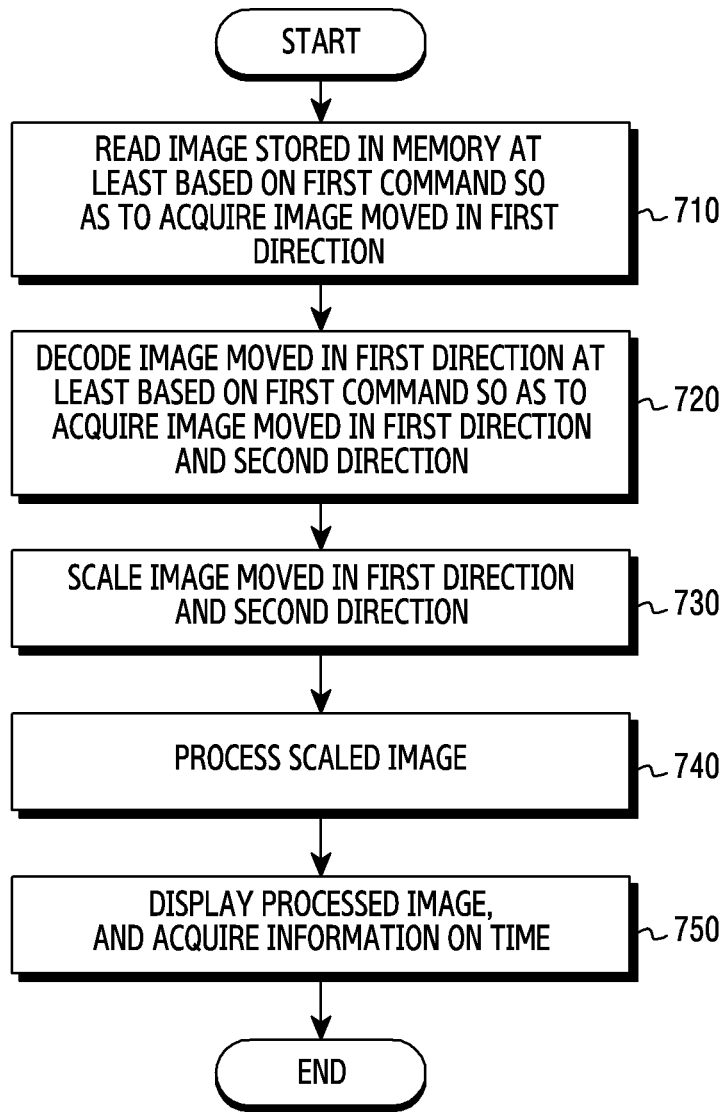
FIG. 7 illustrates an example of an operation of a display driving circuit for displaying an image and acquiring information on a time in an electronic device according to various embodiments.

FIG. 7 illustrates an example of an operation of a display driving circuit for displaying an image and acquiring information on a time in an electronic device according to various embodiments. The operation may be performed by the display driver IC 230 illustrated in FIG. 2 or the display driving circuit 320 illustrated in FIG. 3.

In FIG. 7, the first processor 310 may be in an inactive state while the display driving circuit 320 performs operations 710, 720, 730, 740, and 750.

Operations 710, 720, 730, 740, and 750 of FIG. 7 may be related to operation 640 of FIG. 6.

Referring to FIG. 7, in operation 710, the display driving circuit 320 may read the image stored in a memory (e.g., the GRAM 322) at least based on a first command, and thus may acquire an image moved in a first direction. For example, the first command may include data of an x-coordinate and a y-coordinate of a corner of an upper left end of an area in which the image is initially to be displayed after entry to the AOD mode. The display driving circuit 320 may read the image stored in the GRAM 322 at least based on the first command, and thus may acquire an image moved in the first direction corresponding to a y-axis direction by a distance indicated by the y-coordinate included in the data. In various embodiments, the display driving circuit 320 may acquire an image moved in the first direction by giving timing delay in reading the image.

In operation 720, the display driving circuit 320 may decode the image moved in the first direction at least based on the first command, and thus may acquire an image moved in the first direction and a second direction. For example, the display driving circuit 320 may decode the image moved in the first direction at least based on the first command, and thus may acquire an image which: has been moved in the first direction corresponding to the y-axis direction by a distance indicated by the y-coordinate included in the data; and has been moved in the second direction corresponding to an x-axis direction by a distance indicated by the x-coordinate included in the data. In various embodiments, the display driving circuit 320 may give timing delay in decoding the image, so as to move, in the second direction, the image moved in the first direction, thereby acquiring the image moved in the first direction and the second direction. The display driving circuit 320 may move the image to a position indicated by the first command based on reading and decoding as described above.

In operation 730, the display driving circuit 320 may scale the image moved in the first direction and the second direction. The display driving circuit 320 may scale the image moved in the first direction and the second direction so that the image moved in the first direction and the second direction can be appropriately displayed on the display panel 330. In various embodiments, the display driving circuit 320 may perform processing of a remaining area except for an area occupied by the image in an entire area of the display panel 330 in an operation of scaling the moved image. For example, the display driving circuit 320 may fill the remaining area with a representative color of the image. For example, when a representative color of the image is a black color, the display driving circuit 320 may fill the remaining area with black pixels.

In operation 740, the display driving circuit 320 may process the scaled image. For example, when at least one visual object to be inserted into the image is stored in the GRAM 322 or the side memory, the display driving circuit 320 may include the at least one visual object in the scaled image, and thus may acquire a processed image.

In operation 750, the display driving circuit 320 may display the processed image, and may acquire information on a time elapsing since display of the processed image, by using the timer.

Figure 8:
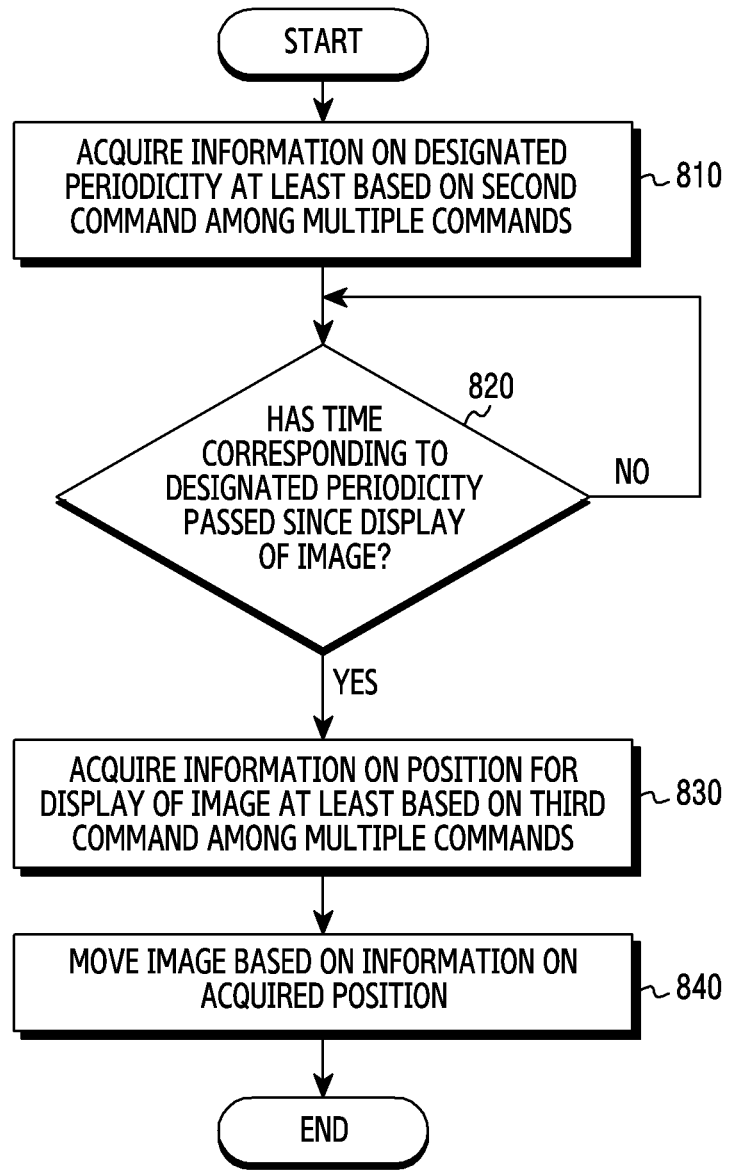

FIG. 8 illustrates an example of an operation of a display driving circuit which is configured to move an image during an AOD mode in an electronic device according to various embodiments. The operation may be performed by the display driver IC 230 illustrated in FIG. 2 or the display driving circuit 320 illustrated in FIG. 3.

Operations 810, 820, 830, and 840 of FIG. 8 may be related to operation 540 of FIG. 5B.

In FIG. 8, the first processor 310 may be in an inactive state while operations 810, 820, 830, and 840 are performed by the display driving circuit 320.

Referring to FIG. 8, in operation 810, the display driving circuit 320 may acquire information on a designated periodicity at least based on a second command among multiple commands. The multiple commands may further include the second command indicating a periodicity used to move the image during provision of the AOD mode. The designated periodicity may be identified by the first processor 310 based on a characteristic of the image including at least one of: a size of the image; a middle point of the image; a center of gravity of effective pixels included in the image; a ratio of effective pixels of the image; an average pixel value of the image; a maximum pixel value of the image; a deviation of pixel values of the image; a brightness of a display panel on which the image is displayed; an OPR of the image; a cumulative stress value of pixels according to movement of the image; or a spatial frequency of the image. The display driving circuit 320 may acquire information on the designated periodicity from the second command among the multiple commands.

In operation 820, the display driving circuit 320 may monitor or identify whether a time corresponding to the designated periodicity has passed since display of the image. For example, the display driving circuit 320 may display the image at a time point t after entry to the AOD mode. After displaying the image at the time point t, the display driving circuit 320 may acquire information on a time elapsing from the time point t by using the timer, and thus may monitor whether a time point t+t$_i$ (in this example, t$_i$ represents a time corresponding to the designated periodicity) has come. If it is identified that the time point t+t$_i$ has come, the display driving circuit 320 may perform operation 830.

In operation 830, the display driving circuit 320 may acquire information on a position for display of the image at least based on a third command among the multiple commands, based on identifying that the time corresponding to the designated periodicity has passed since display of the image. For example, the multiple commands may further include a third command indicating multiple offsets used to change a display position of the image during provision of the AOD mode. Each of the multiple offsets may be identified by the first processor 310 based on a characteristic of the image including at least one of: a size of the image; a middle point of the image; a center of gravity of effective pixels included in the image; a ratio of effective pixels of the image; an average pixel value of the image; a maximum pixel value of the image; a deviation of pixel values of the image; a brightness of a display panel on which the image is displayed; an OPR of the image; a cumulative stress value of pixels according to movement of the image; or a spatial frequency of the image. The display driving circuit 320 may change a display position of the image at every designated periodicity, by using the multiple offsets indicated by the third command. For example, the display driving circuit 320 may identify a position for display of the image by using one offset among the multiple offsets at every designated periodicity. For example, when a position at which the image is initially displayed is (200, 600) and a first offset among the multiple offsets is (+2, −1), the display driving circuit 320 may acquire (202, 599) as information on a position for movement of the image.

In various embodiments, the display driving circuit 320 may acquire information on a position of the at least one visual object included in the image, based on the identified position.

In operation 840, the display driving circuit 320 may move the image based on information on the acquired position. In various embodiments, the display driving circuit 320 may move the image including the at least one visual object, based on the information on the position of the at least one visual object. The display driving circuit 320 may display the moved image on the display panel 330.

The display driving circuit 320 may repeatedly perform operations 810, 820, 830, and 840 during provision of the AOD mode.

FIG. 8 illustrates an example in which a first message includes both the multiple commands and the image, but this configuration is only for convenience of description. It should be noted that: the multiple commands may be transmitted from the first processor 310 to the display driving circuit 320 via another path distinct from a path along which the image is transmitted; or the multiple commands may be transmitted from the first processor 310 to the display driving circuit 320 via the same path as a path along which the image is transmitted, at a time point different from a time point at which the first processor 310 transmits the image.

When a display position of an image is moved by the display driving circuit 320 while the first processor 310 is in an inactive state as described above, the first processor 310 is in the inactive state, and thus may fail to recognize the position of the image moved by the display driving circuit 320. When a driving mode is switched from the AOD mode to a normal mode for displaying an image in a full frame, this failure of recognition of the position of the image may cause distortion related to a timing of display of the image in a full frame. The distortion may be caused by a difference between a path via which an image is provided from the first processor 310 to the display driving circuit 320 and a path via which multiple instructions are provided from the first processor 310 to the display driving circuit 320. In order to prevent the distortion, the electronic device 300 according to various embodiments may switch a state of the first processor 310 to an active state if a designated time passes since switching of the state of the first processor 310 to an inactive state for the AOD mode.

Figure 9:
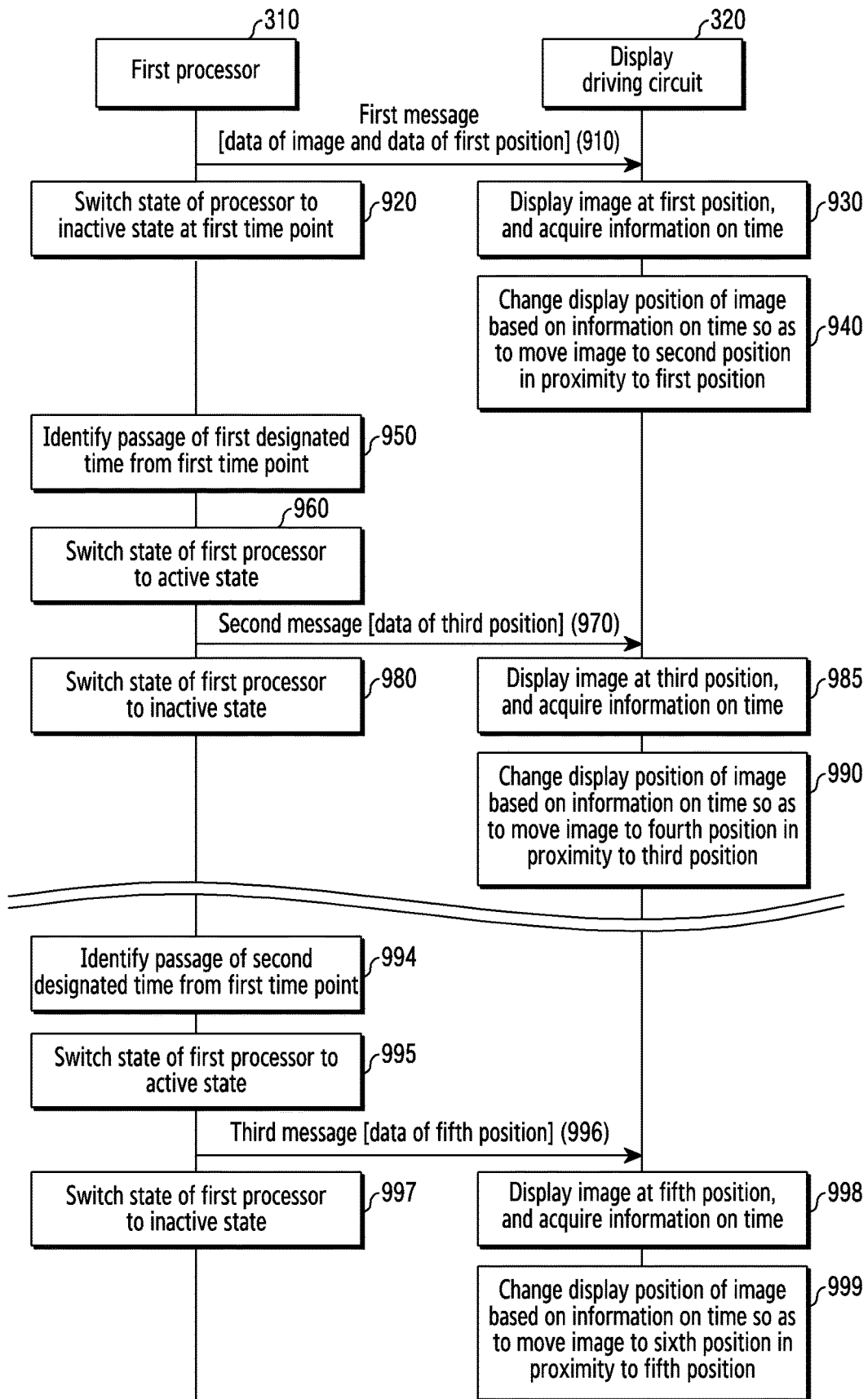
FIG. 9 illustrates still another example of an operation of an electronic device according to various embodiments.

FIG. 9 illustrates still another example of an operation of an electronic device according to various embodiments. The operation may be performed by the electronic device 101 illustrated in FIG. 1, the elements of the electronic device 101 illustrated in FIG. 1, the electronic device 300 illustrated in FIG. 3, or the elements of the electronic device 300 illustrated in FIG. 3.

Referring to FIG. 9, in operation 910, the first processor 310 may transmit a first message to the display driving circuit 320. The first message may include data of an image to be displayed on the display panel 330 while a driving mode of the electronic device 300 is an AOD mode, and data of a first position at which the image is to be initially displayed in the AOD mode. The display driving circuit 320 may receive the first message. The display driving circuit 320 may identify data of the image from the first message, and may identify data of the first position from the first message. Based on identifying of the data, the display driving circuit 320 may store the data of the image in the GRAM 322, and may store the data of the first position in a register of the display driving circuit 320.

In operation 920, the first processor 310 may switch a state thereof to an inactive state at a first time point. At the first time point after the first processor 310 transmits the first message, the first processor 310 may switch a state thereof to the inactive state in order to enter the AOD mode.

For example, referring to FIG. 10, the first processor 310 may transmit, to the display driving circuit 320, the first message including information on the image and information on the first position (e.g., coordinates (300, 800)). After transmitting the first message, the first processor 310 may switch a state thereof to the inactive state.

In operation 930, the display driving circuit 320 may display the image at the first position based on the first message, and may acquire information on a time elapsing since display of the image, by using a timer within the display driving circuit 320.

For example, referring to FIG. 10, the display driving circuit 320 may display the image at coordinates (300, 800) on the display panel 330 based on the first message.

In operation 940, the display driving circuit 320 may change a display position of the image at every designated periodicity based on the information on the time, and thus may move the image from the first position to a second position in proximity to the first position. For example, the designated periodicity may be minute. The image may be displayed at the second position, which is in proximity to the first position, after the first designated time passes. For example, the first processor 310 may configure multiple offsets used to move the image so that the second position can be in proximity to the first position. The first message may include information on the multiple offsets. In various embodiments, the first designated time may be configured in the electronic device 300 in order to specify a time point at which the first processor 310 in the inactive state switches to an active state. In various embodiments, the first designated time may be configured in the first electronic device 300 so that the first processor 310 can reset a movement position of the image. In various embodiments, the first designated time may be configured in the electronic device 300 so that the first processor 310 can recognize a movement position of the image. For example, the first designated time may be 10 minutes.

For example, referring to FIG. 10, after displaying the image at the coordinates (300, 800), the display driving circuit 320 may change a display position of the image at every designated periodicity. For example, the display driving circuit 320 may move the image, displayed at the coordinates (300, 800), by as much as (0, 1) at least based on the multiple offsets acquired via the first message from the first processor 310, and thus may display the image at coordinates (300, 801) on the display panel 330. Because the first processor 310 is in the inactive state at a time point at which the image is displayed at the coordinates (300, 801) on the display panel 330, a position of the image recognized by the first processor 310 may be the coordinates (300, 800) corresponding to the first position.

The display driving circuit 320 may move the image, displayed at the coordinates (300, 801), by as much as (1, −1) at least based on the multiple offsets, and thus may display the image at coordinates (301, 800) on the display panel 330. Because the first processor 310 is in the inactive state at a time point at which the image is displayed at the coordinates (301, 800) on the display panel 330, a position of the image recognized by the first processor 310 may be the coordinates (300, 800).

The display driving circuit 320 may move the image, displayed at the coordinates (301, 800), by as much as (1, 1) at least based on the multiple offsets, and thus may display the image at coordinates (301, 801) on the display panel 330. Because the first processor 310 is in the inactive state at a time point at which the image is displayed at the coordinates (301, 801) on the display panel 330, a position of the image recognized by the first processor 310 may be the coordinates (300, 800). The display driving circuit 320 may display the image at coordinates (301, 801) in proximity to coordinates (300, 800) which is the position of the image recognized by the first processor 310. A time between the first time point and a time point, at which the image is displayed at the coordinates (301, 801) on the display panel 330, may correspond to the first designated time. Each of movement of the image from coordinates (300, 800) to coordinates (300, 801), movement of the image from the coordinates (300, 801) to coordinates (301, 800), and movement of the image from the coordinates (301, 800) to coordinates (301, 801) may be referred to as a "small jump". The small jump may refer to movement of the image performed by the display driving circuit 320 at every designated periodicity.

In operation 950, the first processor 310 may identify passage of the first designated time from the first time point.

In operation 960, the first processor 310 may switch a state thereof to the active state based on identifying of the passage of the first designated time.

In operation 970, the first processor 310 may transmit a second message including information on a third position in response to switching of the state. The third position may be a position of the image defined by the first processor 310 during provision of the AOD mode. The third position may be in proximity to the second position. For example, referring to FIG. 10, the first processor 310 may transmit, to the display driving circuit 320, the second message including the information on the third position (e.g., coordinates (301, 802)). After transmitting the first message, the first processor

310 may switch a state thereof to the inactive state. The display driving circuit 320 may receive the second message including the information on the third position. According to embodiments, the second message may further include data of an image to be displayed at the third position.

In operation 980, after transmitting the second message, the first processor 310 may switch a state thereof to the inactive state.

Meanwhile, in operation 985, the display driving circuit 320 may display the image at the third position based on the second message, and may acquire information on a time elapsing since display of the image at the third position, by using a timer within the display driving circuit 320.

For example, referring to FIG. 10, the display driving circuit 320 may display the image at coordinates (301, 802) on the display panel 330 based on the second message. Because the first processor 310 controls movement of the image from coordinates (301, 801) to coordinates (301, 802) via the second message, the movement of the image from the coordinates (301, 801) to the coordinates (301, 802) may refer to a middle jump performed between the small jump and a big jump described below. The middle jump may refer to movement of the image performed by the first processor 310 whenever the first designated time passes.

In operation 990, the display driving circuit 320 may change a display position of the image at every designated periodicity based on the information on the time, and thus may move the image from the third position to a fourth position in proximity to the third position. The image may be displayed at the fourth position in proximity to the third position after the first designated time passes. For example, the first processor 310 may configure multiple offsets used to move the image so that the fourth position can be in proximity to the third position. The second message may include the multiple offsets.

For example, referring to FIG. 10, after displaying the image at the coordinates (301, 802), the display driving circuit 320 may change a display position of the image at every designated periodicity. For example, the display driving circuit 320 may move the image, displayed at the coordinates (301, 802), by as much as (0, 1) at least based on the multiple offsets acquired via the second message from the first processor 310, and thus may display the image at coordinates (301, 803) on the display panel 330. Because the first processor 310 is in the inactive state at a time point at which the image is displayed at the coordinates (301, 803) on the display panel 330, a position of the image recognized by the first processor 310 may be the coordinates (301, 802) corresponding to the third position.

The display driving circuit 320 may move the image, displayed at the coordinates (301, 803), by as much as (1, 0) at least based on the multiple offsets, and thus may display the image at the coordinates (302, 803) on the display panel 330. Because the first processor 310 is in the inactive state at a time point at which the image is displayed at the coordinates (302, 803) on the display panel 330, a position of the image recognized by the first processor 310 may be the coordinates (301, 802).

The first processor 310 and the display driving circuit 320 may repeatedly perform operations 910 to 990 until a second designated time passes from the first time point. In various embodiments, the second designated time may be configured in the electronic device 300 so that the first processor 310 can move the image to a position spaced farther than a reference distance in order to prevent a burn-in phenomenon. For example, the second designated time may be 60 minutes.

In operation 994, the first processor 310 may identify passage of the second designated time from the first time point.

In operation 995, the first processor 310 may switch a state thereof to the active state based on identifying of the passage of the second designated time. Switching of the state of the first processor 310 to the active state may be performed in order to move the image to a position spaced farther than the reference distance.

In operation 996, the first processor 310 may transmit a third message in response to switching of the state thereof to the active state. The third message may include data of a fifth position of the image configured by the first processor 310. The fifth position may be spaced farther than the reference distance from the first position, the second position, the third position, and the fourth position. The display driving circuit 320 may receive the third message from the first processor 310. According to embodiments, the third message may further include data of an image to be displayed at the fifth position.

In operation 997, after transmitting the third message, the first processor 310 may switch a state thereof to the inactive state.

In operation 998, the display driving circuit 320 may display the image at the fifth position based on the third message, and may acquire information on a time elapsing since display of the image at the fifth position, by using a timer within the display driving circuit 320.

For example, referring to FIG. 10, the display driving circuit 320 may display the image at coordinates (400, 300) on the display panel 330 based on the third message. Because the first processor 310 controls movement of the image to the coordinates (400, 300) via the third message, the movement of the image to the coordinates (400, 300) may be referred to as a "big jump". The big jump may refer to movement of an image performed by the first processor 310 whenever the second designated time passes.

In operation 999, the display driving circuit 320 may change a display position of the image at every designated periodicity based on the information on the time, and thus may move the image from the fifth position to a sixth position in proximity to the fifth position. In other words, the display driving circuit 320 may perform an operation, which is similar to operation 940 or operation 990, in operation 999.

As described above, while operating in the AOD mode, the electronic device 300 according to various embodiments may use the small jump, the middle jump, and the big jump so that the first processor 310 can acquire information on a movement position of the image. By using the small jump, the middle jump, and the big jump, the electronic device 300 can prevent the occurrence of distortion related to a timing when a driving mode of the electronic device 300 switches from the AOD mode to a normal mode for displaying an image in a full frame.

A method of an electronic device according to the above-described various embodiments may include: while a processor of the electronic device operates in an active state, receiving, from the processor, coordinate information of a designated content to be displayed on a display panel while the processor operates in a low-power state, by a display driving circuit of the electronic device; storing the coordinate information in an internal memory by the display driving circuit; displaying the designated content at a first position on the display panel while the processor operates in the low-power state, by the display driving circuit; and moving the designated content displayed at the first position to a second position on the display panel and displaying the designated content at the second position, at least based on the coordinate information stored in the internal memory while the processor operates in the low-power state, by the display driving circuit.

In various embodiments, the method may further include: outputting the designated content on the display panel by the display driving circuit; and displaying a designated color in at least a part of an area in which the designated content is not displayed in an entire area of the display panel, by the display driving circuit. In some embodiments, the designated color may be configured as a representative color of the designated content.

In various embodiments, the method may further include moving the content, displayed at the first position, at every designated periodicity based on the coordinate information while the processor operates in the low-power state, by the display driving circuit.

In various embodiments, the designated content may include an image.

In various embodiments, the method may further include: while the processor operates in the low-power state, moving the designated content, displayed at the first position, at every designated periodicity at least based on the coordinate information in a first designated time, so as to display the content at the second position in proximity to the first position, by the display driving circuit; switching to the active state after a first designated time passes from a time point of switching to the low-power state, by the processor; transmitting information on a third position for display of the content in response to switching to the active state, by the processor; switching to the low-power state after transmitting the information on the third position, by the processor; and displaying the content at the third position based on reception of the information on the third position from the processor, by the display driving circuit. In some embodiments, the method may further include, while the processor operates in the low-power state, moving the content displayed at the third position at every designated periodicity in the first designated time so as to display the content at a fourth position in proximity to the third position, by the display driving circuit.

In various embodiments, the method may further include: switching to the active state after a second designated time passes from a time point of transmission of information on the first position, by the processor; transmitting information on a third position for display of the content, by the processor; and switching to the low-power state after transmitting the information on the third position, by the processor, wherein the third position is spaced by a designated distance from the first position and the second position. In some embodiments, a pixel distance between the first position and the third position may be longer than a pixel distance between the first position and the second position, and a pixel distance between the second position and the third position may be longer than the pixel distance between the first position and the second position.

A method of an electronic device according to the above-described various embodiments may further include: receiving, from a processor of the electronic device, movement information of a designated content to be displayed on a display panel while the processor operates in a low-power state, by a display driving circuit of the electronic device; storing the movement information in an internal memory by the display driving circuit; displaying the designated content at a first position on the display panel while the processor operates in the low-power state, by the display driving circuit; and moving the designated content displayed at the first position to a second position on the display panel and displaying the designated content at the second position, at least based on the movement information stored in the internal memory while the processor operates in the low-power state, by the display driving circuit.

In various embodiments, the movement information may include coordinate information of the second position.

In various embodiments, the movement information may include at least one piece of information among coordinate information of the first position, coordinate information of the second position, and one or more pieces of offset information. For example, in the method, the display driving circuit may be configured to: while the processor operates in the low-power state, change a display position of the content based on the one or more pieces of offset information; and display the content based on the changed display position. For example, the one or more pieces of offset information may be used to represent a difference between the first position and the second position.

A method of an electronic device according to the above-described various embodiments may include: switching a state of a processor of the electronic device to an inactive state based on providing information on an image to a display driving circuit of the electronic device, by the processor; while the processor is in the inactive state, displaying the image on a display panel and acquiring, via a timer, information on a time elapsing since display of the image, by the display driving circuit; and changing a display position of the image at every designated periodicity based on the information on the time while the processor is in the inactive state, by the display driving circuit.

In various embodiments, the switching of the state of the processor to the inactive state by the processor may include switching the state of the processor to the inactive state based on providing the display driving circuit with the information on the image and information on a first position for display of the image, by the processor; and the displaying of the image by the display driving circuit may include displaying the image at the first position while the processor is in the inactive state, by the display driving circuit.

In various embodiments, the switching of the state of the processor to the inactive state by the processor may include switching the state of the processor to the inactive state based on providing the display driving circuit with the information on the image and information representing the designated periodicity, by the processor.

In various embodiments, the switching of the state of the processor to the inactive state by the processor may include switching the state of the processor to the inactive state based on providing the display driving circuit with the information on the image and information on multiple offsets used to change the display position of the image, by the processor; and the changing of the display position of the image at every designated periodicity by the display driving circuit may include changing the display position of the image at every designated periodicity by using the multiple offsets based on the information on the time while the processor is in the inactive state, by the display driving circuit. In some embodiments, the changing of the display position of the image at every designated periodicity by the display driving circuit may include: identifying a position for display of the image by using one offset among the multiple offsets at every designated periodicity, by the display driving circuit; and changing the display position of the image at every designated periodicity by using the information on the time based on identifying of the position while the processor is in the inactive state, by the display driving circuit.

In various embodiments, the method may further include: storing, in the first GRAM, the information on the image acquired from the processor, by the display driving circuit; identifying one or more visual objects to be related to the image from information on multiple visual objects stored in a second GRAM by using another processor included in the display driving circuit while the processor is in the inactive state, by the display driving circuit; displaying the image together with the one or more visual objects on the display panel while the processor is in the inactive state, by the display driving circuit; acquiring, via the timer, the information on the time elapsing since display of the image, by the display driving circuit; changing a display position of the image and the one or more visual objects at every designated periodicity based on the information on the time while the processor is in the inactive state, by the display driving circuit; and changing a state of at least one visual object among the one or more visual objects at every designated periodicity by the display driving circuit. In some embodiments, the state of the at least one visual object may include a display angle of the at least one visual object.

In various embodiments, the method may further include: receiving a signal representing detection of an input for changing a mode of the display panel from a first mode to a second mode while the processor is in the inactive state, by the processor; switching the state of the processor from the inactive state to an active state based on reception of the signal, by the processor; and while the processor is in the active state, controlling the display driving circuit so as to display another image distinct from the image on the display panel, by the processor.

In various embodiments, the switching of the state of the processor to the inactive state by the processor may include switching the state of the processor to the inactive state based on providing the display driving circuit with the information on the image, information on a first position for display of the image, and information for moving the image from the first position, by the processor. Also, the displaying of the image by the display driving circuit may include: displaying the image at the first position while the processor is in the inactive state, by the display driving circuit; acquiring, via the timer, information on a time elapsing since display of the image, by the display driving circuit; and while the processor is in the inactive state, changing the display position of the image at every designated periodicity at least based on the information on the time and the information for moving the image from the first position, so as to move the content to a second position in proximity to the first position, by the display driving circuit. In addition, the method may further include: switching the state of the processor to the active state after a designated time passes from a time point of switching of the state of the processor to the inactive state, by the processor; and providing, in response to switching to the active state, the display driving circuit with information on a third position for display of the content, by the processor.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

What is claimed is:

1. An electronic device comprising:
a display driving circuit comprising a timer and configured to be functionally coupled to a display panel; and
a processor configured to be functionally coupled to the display driving circuit,
wherein
the processor is configured to switch a state of the electronic device to an always-on display (AOD) mode in which the processor switches to an inactive state based on the processor providing, to the display driving circuit, image information for a first image for display on the display panel during the AOD mode, and
the display driving circuit is configured to:
while the electronic device is in the AOD mode,
control the display panel to display the first image;
acquire, via the timer, elapsed time information on a time elapsing since display of the first image in the AOD mode; and
control the display panel to change a display position of the first image at every designated periodicity based on the elapsed time information.

2. The electronic device as claimed in claim 1, wherein:
the processor is configured to switch the state of the electronic device to the AOD mode based on the processor providing, to the display driving circuit, the image information and image position information on a first position for display of the first image; and
the display driving circuit is configured to control the display panel to display the first image at the first position.

3. The electronic device as claimed in claim 1, wherein the processor is configured to switch the state of the electronic device to the AOD mode based on the processor providing, to the display driving circuit, the image information and periodicity information representing the designated periodicity.

4. The electronic device as claimed in claim 1, wherein:
the processor is configured to switch the state of the electronic device to the AOD state based on the processor providing, to the display driving circuit, the image information and offset information on multiple offsets for changing the display position of the first image; and
the display driving circuit is configured to, while the electronic device is in the AOD mode, control the display panel to change the display position of the first image at every designated periodicity using the offset information based on the elapsed time information.

5. The electronic device as claimed in claim 4, wherein the display driving circuit is configured to, while the electronic device is in the AOD mode:
identify a position for display of the first image by using one offset among the multiple offsets at every designated periodicity; and
control the display panel to change the display position of the first image at every designated periodicity using the elapsed time information based on the identified position.

6. The electronic device as claimed in claim 1, wherein:
the display driving circuit further comprises another processor, a first Graphic Random Access memory (GRAM), and a second GRAM; and
the another processor comprises the timer,
wherein the display driving circuit is configured to:
store, in the first GRAM, the information on the first image acquired from the processor; and
while the electronic device is in the AOD mode:
identify, using the another processor, one or more visual objects to be related to the first image from information on multiple visual objects stored in the second GRAM;
control the display panel to display the first image together with the one or more visual objects; and
control the display panel to change a display position of the first image and the one or more visual objects at every designated periodicity based on the elapsed time information, and change a state of at least one visual object among the one or more visual objects at every designated periodicity.

7. The electronic device as claimed in claim 6, wherein the state of the at least one visual object comprises a display angle of the at least one visual object.

8. The electronic device as claimed in claim 1, wherein the processor is further configured to:
receive a signal representing detection of an input for changing a mode of the display panel from a first mode to a second mode, while the electronic device is in the AOD mode;

switch the state of the processor from the inactive state to an active state based on receiving the signal; and while the processor is in the active state, control the display driving circuit to display on the display panel a second image different from the first image.

9. The electronic device as claimed in claim 1, wherein:

the processor is configured to switch the state of the electronic device to the AOD mode based on the processor providing, to the display driving circuit, the image information, position information on a first position for display of the first image, and moving information for moving the first image from the first position;

the display driving circuit is configured to:

while the electronic device is in the AOD mode, control the display panel to display the first image at the first position, and control the display panel to change the display position of the first image at every designated periodicity at least based on the elapsed time information and the moving information, to move the first image to a second position; and the processor is further configured to:

switch the state of the processor to an active state after a designated time passes from a time point of switching of the state of the processor to the inactive state, and provide, to the display driving circuit, based on switching to the active state, position information on a third position for display of the first image.

10. An electronic device comprising:

a display panel;

a processor; and a display driving circuit comprising an internal memory and configured to be capable of driving the display panel, wherein the display driving circuit is configured to:

while the processor operates in an active state, receive, from the processor, coordinate information of designated content to be displayed on the display panel while the processor operates in a low-power state; and store the coordinate information in the internal memory; and while the processor is in the low-power state, control the display panel to display the designated content at a first position; and control the display panel to move the display of the designated content from the first position to a second position, at least based on the coordinate information stored in the internal memory.

11. The electronic device as claimed in claim 10, wherein the display driving circuit is configured to:

while the processor operates in the low-power state, control the display panel to display a designated color in at least a part of an area in which the designated content is not displayed.

12. The electronic device as claimed in claim 10, wherein the display driving circuit is configured to, while the processor operates in the low-power state, control the display panel to move the content at every designated periodicity based on the coordinate information.

13. The electronic device as claimed in claim 10, wherein the display driving circuit is configured to, while the processor operates in the low-power state, control the display panel to move the designated content at every designated periodicity at least based on the coordinate information, and the processor is further configured to:

switch from the low-power state to the active state when a designated time elapses in the low-power state;

transmit further coordinate information on a third position for display of the content at least in response to switching to the active state; and switch to the low-power state after transmitting the further coordinate information on the third position.

14. The electronic device as claimed in claim 10, wherein:

the processor is further configured to:

switch to the active state after a designated time elapses from when the coordinate information is transmitted, transmit further coordinate information on a third position for display of the content, and switch to the low-power state after transmitting the further coordinate information; and the third position is spaced by a designated distance from the first position and the second position.

15. An electronic device comprising:

a display panel;

a processor; and a display driving circuit comprising an internal memory and configured to be capable of driving the display panel, wherein the display driving circuit is configured to:

while the processor operates in an active state, receive, from the processor, movement information of designated content to be displayed on the display panel while the processor operates in a low-power state;

store the movement information in the internal memory; and while the processor operates in the low-power state:

control the display panel to display the designated content at a first position; and control the display panel to move the display of the designated content from the first position to a second position, at least based on the movement information stored in the internal memory.

* * * * *